United States Patent [19]
Fisher et al.

[11] Patent Number: 5,544,458
[45] Date of Patent: Aug. 13, 1996

[54] VEHICLE PANEL ASSEMBLY

[75] Inventors: Daniel J. Fisher; Douglas Crank; Marc A. Lovell; Sabina J. Houle, all of Holland, Mich.; James L. Brodie, Hudsonville, Mich.

[73] Assignee: Donnelly Corporation, Holland, Mich.

[21] Appl. No.: 27,078

[22] Filed: Mar. 5, 1993

[51] Int. Cl.[6] .................. E06B 3/54; B60J 1/10; B60J 10/02
[52] U.S. Cl. .................. 52/204.591; 52/204.62; 52/208; 156/245; 264/135; 264/259; 296/84.1; 296/90; 296/93
[58] Field of Search .................. 52/204.5, 204.62, 52/204.7, 204.591, 208; 296/84.1, 85, 90, 93; 156/242, 245; 264/135, 259, 328.1

[56] References Cited

U.S. PATENT DOCUMENTS

| | | |
|---|---|---|
| 3,381,340 | 4/1968 | Chapin, Jr. . |
| 3,427,776 | 2/1969 | Lake et al. . |

(List continued on next page.)

FOREIGN PATENT DOCUMENTS

| | | |
|---|---|---|
| 382602 | 8/1990 | European Pat. Off. . |
| 1945291 | 5/1971 | Germany . |
| 3020906 | 12/1981 | Germany . |
| 3140366 | 6/1983 | Germany . |

(List continued on next page.)

OTHER PUBLICATIONS

Material Safety Data Sheet, published Apr. 17, 1990, by B. F. Goodrich Adhesive Systems, A–1167–B.
Material Safety Data Sheet, published Apr. 30, 1989, by B. F. Goodrich Adhesive Systems, A–1100–B.
Material Safety Data Sheet, published May 7, 1992, by B. F. Goodrich Adhesive Systems, EXP 535.
Material Safety Data Sheet, published July 10, 1992, by B. F. Goodrich Adhesive Systems, EXP 541.

*Primary Examiner*—Michael Safavi
*Attorney, Agent, or Firm*—Van Dyke, Gardner, Linn & Burkhart, LLP

[57] ABSTRACT

A single-sided gasketed panel assembly for use as a flush-mounted panel or window in vehicles, buildings, or other structures, as well as a method and apparatus for making such panel assemblies, wherein the panel assembly comprises a sheet-like panel having; a primer layer and at least one polymeric gasket molded to the panel on the primer layer. The primer applied to the panel has a predetermined transition temperature above which improved adhesion properties are exhibited for polymeric gaskets molded thereon when the primer is at or above such temperature. In a preferred embodiment, a gasket is molded from a thermoplastic polymeric material such as PVC onto the primed portion of the panel while the panel is at or above the transition temperature. The resulting bond between the gasket and panel can withstand a shear force greater than 300 pounds per square inch at a rate of 25 millimeters per minute and a 180° peel test force greater than 30 pounds per linear inch at a rate of 25 millimeters per minute after soaking for at least 250 hours in water having a temperature greater than 175° F.

The method for manufacturing the panel assembly includes applying a primer having a predetermined transition temperature as a coating to a surface of a panel, heating the panel and primer coating to a temperature at least equal to the transition temperature of the primer, and molding a gasket, preferably of a thermoplastic polymeric material, onto the surface of the heated panel and the primer coating while the temperature of the primer coating is at least equal to the primer transition temperature. The preferred mold assembly includes a mold cavity defined in a facing surface of one mold section and a heat insulative pad in the second mold section, the pad being urged against the surface of a sheet-like panel at a position opposite the mold cavity when the mold sections are closed.

75 Claims, 10 Drawing Sheets

U.S. PATENT DOCUMENTS

| | | | |
|---|---|---|---|
| 3,659,896 | 5/1972 | Smith et al. ............................... 296/93 |
| 3,797,984 | 3/1974 | Yago et al. . | |
| 4,093,304 | 6/1978 | Ziegler . | |
| 4,139,234 | 2/1979 | Morgan ..................................... 52/208 |
| 4,284,673 | 8/1981 | Ockels . | |
| 4,364,214 | 12/1982 | Morgan et al. . | |
| 4,571,278 | 2/1986 | Kunery ..................................... 52/208 |
| 4,584,155 | 4/1986 | Zanella . | |
| 4,626,185 | 12/1986 | Monnet . | |
| 4,662,113 | 5/1987 | Weaver . | |
| 4,688,752 | 8/1987 | Barteck et al. . | |
| 4,700,525 | 10/1987 | Nieboer et al. . | |
| 4,792,425 | 12/1988 | Weaver . | |
| 4,830,804 | 5/1989 | Weaver . | |
| 4,839,122 | 6/1989 | Weaver . | |
| 4,854,599 | 8/1989 | Barteck . | |
| 4,879,853 | 11/1989 | Braendle et al. . | |
| 4,894,972 | 1/1990 | Endoh et al. . | |
| 4,915,395 | 4/1990 | Barteck . | |
| 4,925,511 | 5/1990 | Ikeda et al. ............................ 296/84.1 |
| 5,061,429 | 10/1991 | Yoshihara et al. . | |
| 5,158,638 | 10/1992 | Osanami et al. . | |
| 5,268,183 | 12/1993 | Garza . | |

FOREIGN PATENT DOCUMENTS

| | | |
|---|---|---|
| 56-154025 | 11/1981 | Japan . |
| 59-24884 | 2/1984 | Japan . |
| 6434713 | 2/1989 | Japan . |
| 6456516 | 3/1989 | Japan . |
| 1110114 | 4/1989 | Japan . |
| 1122722 | 5/1989 | Japan . |
| 1122723 | 5/1989 | Japan . |
| 2182424 | 7/1990 | Japan . |
| 2258844 | 10/1990 | Japan . |
| 370626 | 3/1991 | Japan . |
| 695257 | 8/1953 | United Kingdom . |
| 2141375 | 12/1984 | United Kingdom . |
| 2147244 | 5/1985 | United Kingdom . |
| 2115049 | 3/1986 | United Kingdom . |

VEHICLE PANEL ASSEMBLY

BACKGROUND OF THE INVENTION

This invention relates to panel assemblies, and particularly to flush-mounted panel assemblies having a gasket mounted on a single side and used as panels or windows in vehicles, buildings or other structures, as well as a method and apparatus for making such panel assemblies.

Relatively recent in the history of vehicle window panel assemblies, gaskets have been molded or extruded directly on to the window panel. In molded window panels, a sheet of glass is closed within a molding tool, and a polymeric material is then injected around the peripheral edge on the opposing surfaces, thereby capturing the peripheral edge of the glass panel within the injected polymeric material. After the material has cured, the mold is opened and the panel assembly is removed. To retain the modular panel assembly within the vehicle, studs or clips may be molded within or attached to the gasket and panel and used to engage the pinch flange forming the vehicle opening. Alternatively, or in addition thereto, a bead of adhesive can be applied to bond the panel assembly directly to the pinch flange.

New styling requirements are calling for flush-mounted glass panels having an exposed peripheral edge on the glass panel. One flush-mounted vehicle panel assembly on the market includes an extruded gasket of a thermosetting material deposited directly on one surface of a glass sheet. Often the extrusion includes two adhesive beads of polyurethane compounds, one deposited by the panel assembly manufacturer and the other applied by the vehicle assembler. Disadvantages associated with the extruded gaskets include long cure time for the first bead, adding cycle time to manufacturing. In addition, the gasket material used in forming the extruded gasket is typically not UV stable by itself and can degrade over time. Moreover, the extrusion does not easily adapt itself to receive mounting studs or clips. In addition, gaskets having a variable cross section cannot easily be formed using the extrusion method. Moreover, the extrusion compound is expensive and requires special storage and handling once formed.

Another window assembly intended for use in flush-mounted applications is a gasket of a thermosetting material molded directly to a single surface of a panel in a molding machine using reaction injection molded (RIM) urethane. Although this technique offers some variable cross sections, disadvantages include instability when subjected to prolonged exposures of UV light, a long cycle time in forming, and increased material costs compared with other materials such as thermoplastic elastomers, and in particular, thermoplastic vinyls including PVC. In addition, tensional or shear force applied between the glass and the gasket results in failure of the adhesive seal of the gasket with the panel as opposed to the desired loss of cohesion in the gasket itself.

None of the prior panel assemblies or methods provide flush-mounted gaskets having adhesion and bonding characteristics where the cohesiveness of the gasket fails under shear and peel tests after prolonged soaking in water. In particular, the prior methods or panel assemblies fail to provide a flush-mounted gasket having adhesion and bonding characteristics between gasket and panel surface which withstand a shear force in excess of 300 pounds per square inch or a 180 degree peel test greater than 30 pounds per linear inch after being soaked in 80° C. water for 250 hours or more. Any resulting failure occurs in the adhesion of the gasket to the panel surface.

Thus, a need has existed in the industry for an excellent, reliable, high strength bond formed between the panel surface and the gasket of a flush mounted panel assembly having a single-sided gasket wherein the bond is capable of withstanding prolonged exposure to water. Such bond should not degrade or erode because of water wicking between the panel surface and the gasket, which in prior assemblies results in the failure of the gasket to panel bond in tests.

SUMMARY OF THE INVENTION

Accordingly, the present invention includes a unique panel assembly, especially for vehicles, having a gasket bonded to a single surface of a panel, and adapted for use in flush mounted applications wherein adhesion of the gasket to the panel, the water resilience of the adhesive joint thereto, is unsurpassed by prior known assemblies. The invention also includes a new mold assembly for forming the gasket on the panel. The new mold assembly uses lower clamping and injection pressures to produce the panel assembly in less time and with less product breakage or rejection than produced by conventional PVC injection molding systems. The invention further includes a method for manufacturing the panel assembly which results in the improved adhesion of the gasket to the panel unobtainable using prior known methods.

In one form, the panel assembly of this invention includes a sheet-like panel having a pair of surfaces terminating in a peripheral edge. A primer overlies a predetermined area of the panel surface, the primer having a predetermined transition temperature. Molded to the panel on at least a portion of the panel surface having the primer is a polymeric gasket, the gasket being molded on the primer at a temperature greater than or equal to the primer transition temperature. For one preferred primer, the transition temperature is about 250° F.

In another form, the panel assembly of this invention includes a panel of predetermined geometry having opposing surfaces which terminate in a peripheral edge. Deposited on a portion of at least one surface of the panel is a bonding material. The bond material receives a gasket formed thereon and bonds the gasket to the one surface of the panel such that the bond withstands a shear force greater than 300 pounds per square inch and a 180 degree peel force greater than 30 pounds per linear inch after soaking for at least 250 hours in water having a temperature greater than 175° F. (80° C.). If failure occurs, it is desirable that the failure occur in the cohesiveness of the gasket, and not at the adhesive bond between the gasket and the panel.

In yet another form of the panel assembly, the gasket may be molded so as to have a variable cross section around the same panel. Furthermore, the gasket may be molded about and partially encapsulate guiding or mounting hardware used to locate and fix the panel assembly in the window opening. Alternatively, such hardware may be located inboard, outboard or on the gasket. An adhesive such as a bead of urethane or strip of butyl tape may also be used to retain and/or seal the panel assembly in the window opening. Preferably, the gasket is molded from a thermoplastic polymeric material such as polyvinyl chloride.

According to another aspect of the invention, the panel assembly described above is manufactured in a mold assembly including at least a pair of cooperating mold sections movable between open and closed positions. A mold cavity is defined in a facing surface of one mold surface and adapted to support and seal against one surface of the sheet-like panel. A heat insulative pad is retained in a facing surface of the opposite mold section to be urged against a surface of the sheet-like panel directly opposite the mold cavity when the pair of mold sections are closed.

According to yet another form of the inventive mold assembly, a pressure pad is retained in a facing surface of one mold section and is urged against the panel directly opposite the mold cavity to force the panel against and seal with the facing surface of the second mold section which contains the mold cavity when the mold sections are closed.

The panel assembly and mold assembly are used in association with a method to produce the improved bond of the gasket to one surface of the panel. According to one form, the method includes providing a sheet-like panel having a primer coating having a predetermined transition temperature applied to a portion of the surface of the panel. The panel and primer are subsequently heated to a temperature at least equal to the transition temperature of the primer. With the primer at the transition temperature or higher, a polymeric gasket is molded onto a portion of the panel covered by the primer. The polymeric gasket is molded at a temperature at least equal to the transition temperature of the primer. According to a narrower aspect of the method, the panel assembly is post heated from a side opposite that containing the gasket. Heat is applied for up to 30 minutes to again raise the temperature of the primer up to or above the primer transition temperature.

According to yet another aspect, the invention includes a panel assembly made according to the method, including providing a panel having a primer coating having a known primer transition temperature is applied to at least a portion of a panel surface. Subsequently, the panel and primer coating are heated to raise the temperature of the primer to at least the transition temperature of the primer. While maintaining the temperature of the panel and primer greater than the primer transition temperature, a polymeric gasket is molded onto the primer coating. The melt temperature of the polymeric material is preferably at a temperature at least equal to the transition temperature of the primer.

The advantages provided by the various aspects of the invention are numerous. These include a superior, and heretofore unobtainable, adherence of a molded gasket to a single surface of a panel for use in flush-mounted panel applications. In addition to the superior bond, other advantages include as much as a two-thirds weight reduction in the finished gasket over prior panel assemblies having three-sided PVC encapsulations. The substantial reduction in weight is achieved by using less material per linear inch to form the gasket than in prior assemblies which, in turn, produces less encroachment in from the panel peripheral edge. Since less material is used, this savings is translated into lower costs than for prior three-sided PVC encapsulated panel assemblies. The molding of the gasket to a single surface of the panel permits gaskets of variable cross section about the entire panel, unobtainable using an extrusion technique. Moreover, the gaskets of the present invention provide a substantially impenetrable barrier to water wicking between the panel and the gasket. The resistance to water penetration and degradation also makes this structure and method applicable to many other uses in addition to flush mounted modular vehicle window assemblies. Advantages provided by the manufacturing process include less clamping tonnage and injection pressures than conventional PVC injection molding techniques which results in less flash, and waste due to breakage, improved cycle times for each assembly, and increased productivity. Also, the single sided gaskets can be made less wide, and hence less obtrusive, using the concept of this invention while still retaining the advantages listed above.

BRIEF DESCRIPTION OF THE DRAWING FIGURES

A better understanding of the invention and advantages provided thereby may be obtained by reference to the specification and the attached drawing figures, wherein.

DETAILED DESCRIPTION OF THE PREFERRED EMBODIMENTS

For the purposes of the following description, the terms "upper," "lower," "right," "left," "front," "rear," "vertical," "horizontal," and derivatives or equivalents thereof shall relate to the invention as oriented in FIGS. 2, and 13–15. It is understood that the invention may assume various alternative orientations, except where expressly specified to the contrary. It is also understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered limiting unless the claims expressly state otherwise.

PANEL ASSEMBLIES

Figure 1:
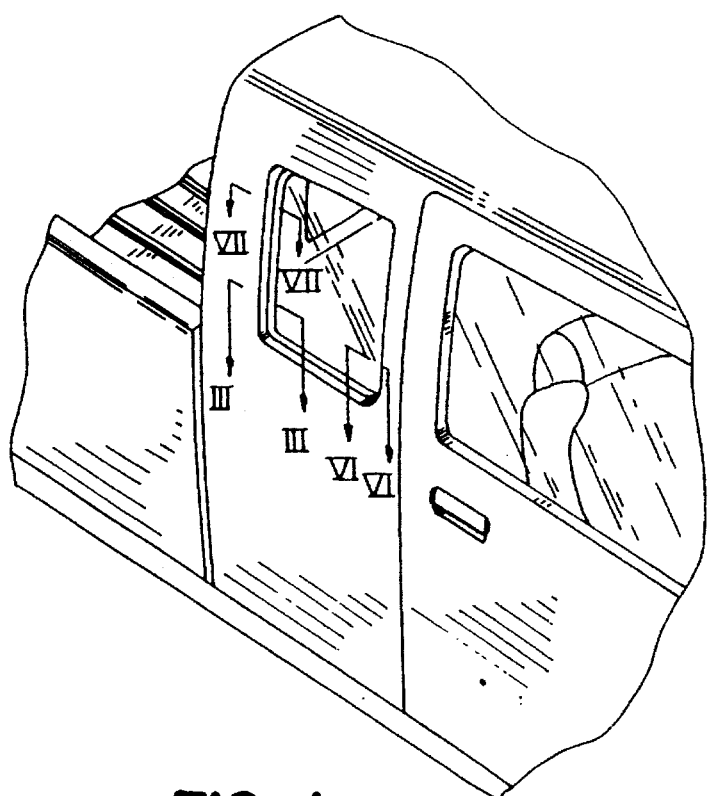
FIG. 1 is a fragmentary, perspective view of a vehicle containing one embodiment of the panel assembly of the invention.
Figure 18:
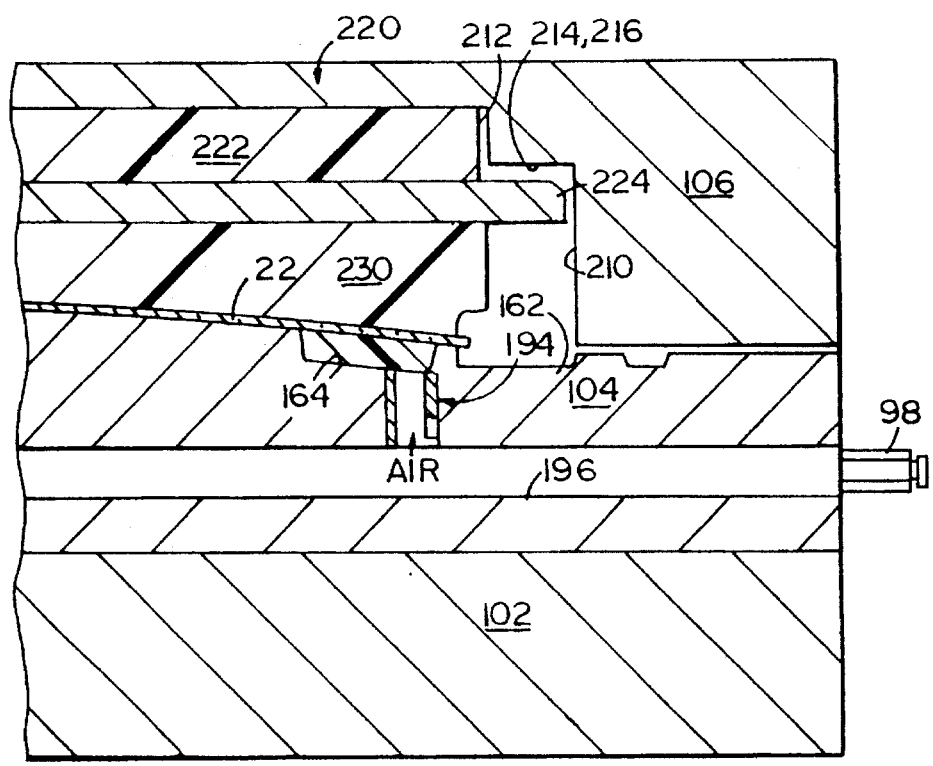
FIG. 18 is a fragmentary section view of the mated mold assembly taken along line XVIII—XVIII shown in FIG. 14.
Figure 3:
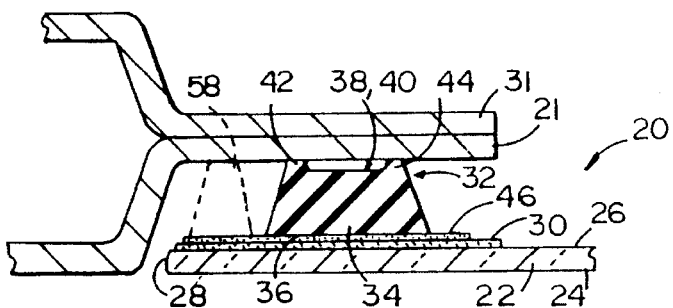
FIGS. 3–5 are fragmentary sectional views of several embodiments of the panel assembly taken along line III—III shown in FIG. 1.
Figure 2:
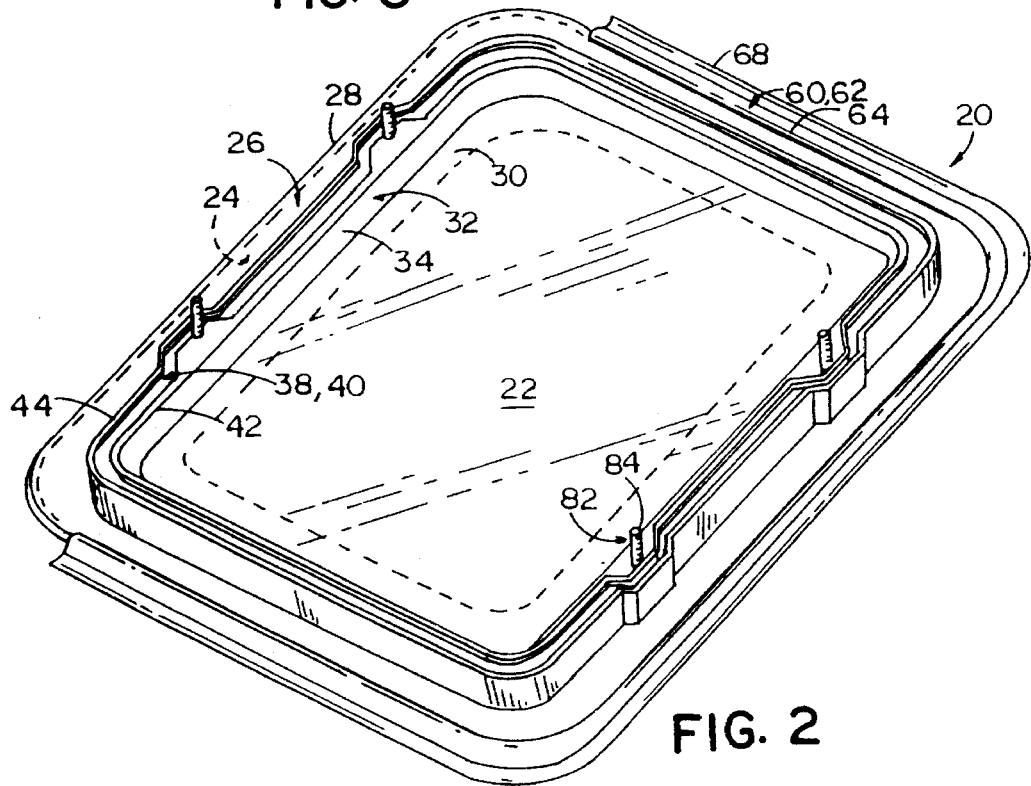
FIG. 2 is a view of the interior side of the panel assembly shown in FIG. 1 and removed from the vehicle opening.

Referring now to FIGS. 1–12, different embodiments of the inventive panel assembly are shown. FIGS. 1–3 illustrate one embodiment of a single-sided gasketed panel assembly 20 of the present invention specifically adapted for closing a window in a vehicle opening 21, although it is contemplated that the same structure and method may be used for panel assemblies in buildings, ships and the like. Panel assembly 20 includes a panel or sheet 22, preferably of transparent glass which may be tempered, laminated, or otherwise strengthened using conventional techniques and principles. Sheet 22 has two substantially parallel sides, surfaces, or faces 24, 26 which terminate at a peripheral edge 28 of predetermined geometric shape. Although transparent glass is preferred, other sheet-like panel materials may be used such as opaque or coated glass, transparent coated or opaque plastic materials, or multicomposite laminates, such as transparent glass and plastic.

Optionally, and preferably, deposited on and bonded to surface 26 of panel 22 is an opaque, and preferably black frit layer, and most preferably a ceramic frit layer or coating 30 covering and concealing a region from peripheral edge 28 inward. Alternately, frit layer 30 may cover all or substantially all of surface 26. Usually, however, frit layer 30 conceals a peripheral area of surface 26 near edge 28, such as two or so inches in from edge 28. Glass panel 22, which is initially in an untempered condition after cutting and sizing to its desired shape, is painted by screen coating or other techniques, with a coating of dark ceramic paint on its rear surface 26. Thereafter, glass panel 22 is suitably heated and bent to the desired contour with a bending furnace or other bending apparatus, followed by tempering to strengthen the glass. Such heating, bending, and tempering operations cause the ceramic paint on surface 26 of the glass to become fused to the surface 26. Thus, although starting as a layer of paint containing ceramic particles and pigment, coating 30 ends up, after bending and tempering, as a thin frit layer of ceramic material which, in actuality, is fused to surface 26 of glass panel 22. Since ceramic frit coating 30 includes pigment of a desired color, preferably a dark color such as black, dark blue, or the like, the layer results in a permanent, second surface coloration of the glass panel. When viewed from the front side, the transparent thickness of panel 22, backed up by the colored ceramic frit layer 30, provides an appearance of depth and richness which blends well with the surrounding painted or glass areas on a vehicle.

One ceramic paint used to form the opaque black ceramic frit coating 30, described above, is manufactured by Drakenfeld Pigments Division of Ciba-Geigy Corporation of Washington, Pa. Such paint includes small ceramic particles and a suitable metal oxide pigment suspended in oil of a type conventionally known in the art. The resulting frit layer is opaque and normally black in color. This ceramic paint is preferably screen-coated on a predetermined portion of rear surface 26 of panel 22 using a 200 mesh screen. The resulting frit layer 30 has the ceramic particles melted and fused to one another, is permanently bonded and fused to the rear glass surface 26, and is the equivalent of the glass itself in terms of strength and adherence.

Fixed to ceramic frit layer 30, and extending along and around at least a portion of sheet 22 and spaced in from peripheral edge 28, is a flexible, resilient polymeric form or bead which defines a static spacer, gasket, or grommet 32 (hereinafter "gasket") intended to engage pinch flange 31 of the window opening when installed. It is preferred that polymeric gasket 32 be formed from a thermoplastic material such as a thermoplastic elastomer selected from the group of thermoplastic rubbers (TPR), thermoplastic urethanes (TPU), thermoplastic olefins (TPO), and thermoplastic vinyls (TPV). It is most preferred to form gasket 32 from a thermoplastic vinyl such as polyvinyl chloride (PVC).

In one embodiment (FIG. 3), gasket 32 includes a body 34 of generally trapezoidal cross section having a first surface 36 in intimate contact with, and bonded to, ceramic frit layer 30. An opposite surface 38 includes a generally rectangular channel 40 which may extend along the entire length of spacer or gasket 32. Channel 40, in turn, defines first and second flanges 42, 44, respectively, which run adjacent channel 40. Although it is preferred that gasket 32 have a width less than or equal to 0.75 inch and a thickness less than or equal to 1.0 inch, the thickness and width of gasket body 34 and flanges 42, 44 may vary depending upon the application of window panel assembly 20. One portion of gasket 32 may have a profile upwards of 1.0 inch thick, while another portion may have a thinner, low profile at another location on panel 22. The width dimension may also vary as shown in FIG. 2 such as the wider areas where guides/fasteners 84 are located. As will become more apparent, panel 22 may also have a spacer or gasket with more than one cross-sectional profile, or might have separate portions of the same or differing size, thickness, width and/or profile.

Although gasket 32 may be made using a variety of techniques, including liquid, slurry and compression molding, the preferred technique is injection molding using the preferred PVC material. An example of a preferred PVC is Vista brand 462-34B flexible PVC compound having a Shore hardness of approximately 85 "A" durometer and a specific gravity of approximately 1.35 grams per cubic centimeter. The Vista brand 462-34B PVC compound is available from Vista Chemical Company located in Aberdeen, Miss. It is contemplated that other molding materials may also be used including thermoplastic elastomers such as KRAYTON™ thermoplastic rubber (TPR), thermoplastic urethane (TPU) and thermoplastic olefin (TPO).

Bonding gasket 32 to ceramic frit layer 30 is an adhesive primer layer 46. Adhesive 46 preferably has an acrylic base included with a cross-linking component. Most preferably, adhesive primer 46 has an acrylic base, and a cross-linker including an epoxy component and a silane coupling agent. The silane coupling agent may be mixed with the primer components or applied separately. In the adhesive primers found to provide the best adhesion, the ratio of the epoxy compound and the silane coupling agent, by equivalent weight, is greater than one. Table I provides a listing of the adhesive primers found to produce the desired adhesive properties.

TABLE I

| Manufacturer | City, State | Designation |
| --- | --- | --- |
| B. F. Goodrich | Akron, OH | A-1100B plus A-1167-B at 20:1 ratio |
| Donnelly Corp. | Holland, MI | A-57 (includes silane coupling agent) |
| B. F. Goodrich | Akron, OH | EXP 541 plus EXP 535 at 20:1 ratio |
| Donnelly Corp. | Holland, MI | A-4793 |

The preferred adhesive primer used in the panel assembly, and method described below, is Donnelly Corporation's A-57. The A-57 primer adhesive includes 27.7 weight percent of a polymethylmethacrylate (PMMA) acrylic solution component designated ACRYLOID™ A-10S; produced by Rohm and Haas of Bristol, Pa., 1.9 weight percent of an epoxy resin component designated D.E.R. 331 available from Dow Chemical located in Midland, Mich., and a 1.1 weight percent of a aminoalkyl functional silane component designated Z-6020 available from Dow Corning, also located in Midland, Mich. The respective ratios of each of the components are mixed with 48 weight percent toluene solvent and 21.3 weight percent methyl alcohol to achieve the preferred consistency. The Donnelly A-47 primer adhesive includes 2.0 parts of B.F. Goodrich A-1100-B acrylic base mixed with 1 part BETASEAL brand 43547 silane component available from Essex Chemical Corp. of Sayerville, N.J.

All of the adhesive primers 46, identified above in Table I, exhibit a significant improvement in its adhesion after being heated to a temperature greater than its transition temperature, which is usually at least 200° F. and receiving the molded gasket 32 while at or above that temperature. The temperature at which this marked improvement in bonding occurs is defined as the "primer transition temperature". For the primers identified above, the primer transition temperature is above 200° F. This characteristic and the method for determining the primer transition temperature will be described in greater detail below.

Figure 5:
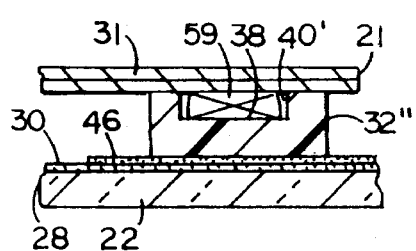

In a preferred embodiment a butyl seal 48 is located on gasket 32 after molding so as to form a seal between gasket 32 and pinch flange 31. It is preferred to locate seal 48 along surface 38 and most preferably in channel 40 such as shown in FIG. 9. Alternatively, butyl tape 59 may be deposited in channel 40' to form a water resistant seal with pinch flange 31 (FIG. 5). When used in combination with fasteners 84, gasket 32 compresses seal 48 against pinch flange 31 to form a substantially weather tight seal. One example of a suitable butyl tape or seal is available from Preform Sealant Inc. of Warrenville, Ohio; and is designated 5.5 mm air core. In the alternative, and preferably when panel assembly 20 is not mechanically assisted to remain in the vehicle opening, a urethane adhesive 58, 58' is used. See FIGS. 3–4 and 6–8. One example of a suitable urethane adhesive is BETASEAL brand adhesive available from Essex Chemical Corp. of Sayerville, N.J. which is a urethane material. Adhesive 58 is selected for its ability to bond glass or ceramic to metal and retain panel assembly 20 within the vehicle opening. In one embodiment shown in FIG. 4, an adhesive bead 58' is deposited along surface 38 in channel 40 to bond panel assembly 20 to pinch flange 31. In this embodiment, the spacing of gasket 32' inwardly from edge 28, i.e., the encroachment of gasket 32' and frit layer 30 inwardly from peripheral edge 28, is minimized.

Figure 6:
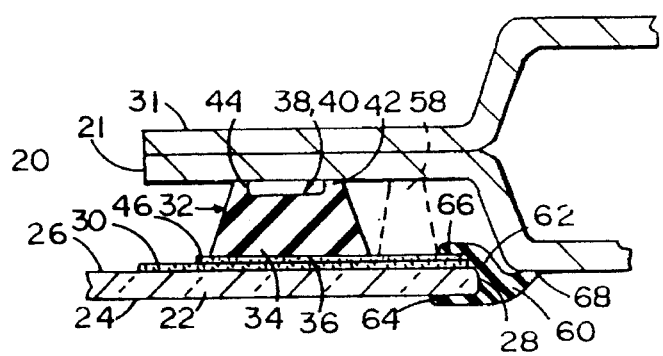

In another embodiment, shown in FIG. 6, in addition to gasket 32 described above, panel assembly 20 may include a second gasket 60 adapted to engage the panel opening or exterior of the vehicle. Gasket 60 is preferably molded onto and bonded to panel 22 about at least a portion of peripheral edge 28 and in some cases to a portion of frit layer 30. In those applications where it is desirable to close the gap between panel peripheral edge 28 and the panel opening, gasket 60 is formed so that it substantially encloses or encapsulates peripheral edge 28. Typically, gasket 60 is also applied over the same adhesion promoting primer coating as applied to the areas of panel 22 over which the single-sided gasket is molded.

Gasket 60 includes a body portion 62 from which a pair of securing flanges 64, 66 extend inwardly a predetermined distance over opposing panel surfaces 24, 26, respectively. A lip portion 68 extends from body 62 in a direction generally opposite to securing flanges 64, 66 to engage the vehicle panel opening or body. A bead of BETASEAL or other adhesive may be deposited on frit layer 30 between spacer 32 and seal 60 or in channel 40, as described above. When mechanical fasteners are used, it is preferred to use the butyl seal 48 as described above. Together with any locating or mounting hardware, described below, seal 48 seals panel assembly 20 in the panel opening.

Figure 7:
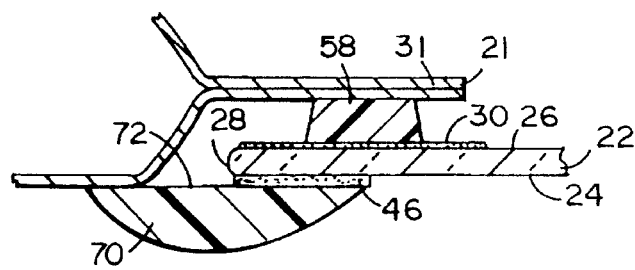
Figure 4:
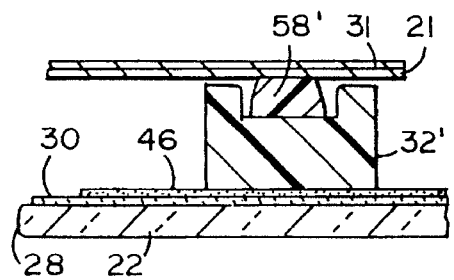

Another form of the inventive panel assembly 20, shown in FIG. 7, provides an exterior gasket or lip seal 70 for use on automotive window surfaces which are exposed to the exterior and in view, known as "Class A" surfaces. Panel 22 includes a ceramic frit layer 30 deposited on surface 26 proximate peripheral edge 28. A bead of urethane adhesive such as 58, described above, bonds panel 22 to pinch flange 31 forming opening 21. A portion of panel surface 24 proximate peripheral edge 28 receives part of surface 72 of molded lip seal 70 which is bonded thereto by adhesive primer 46 using the method of the present invention. The remaining portion of lip seal 70 extending and cantilevered from panel 22 is designed to bridge and close a gap between peripheral edge 28 and the vehicles body to seal out water, dust, and other contaminants.

Yet another form of the inventive panel assembly 20 uses mechanical locators or mounting hardware to position, guide, and fix panel assembly 20 within window opening 21. One embodiment, shown in FIG. 8, includes a locating and mounting stud 82 having a shaft portion 84 terminating at one end in a head portion 92. Head portion 92 and a portion of shaft 84 are encapsulated within gasket 32 such that the remaining portion of shaft 84 extends out from gasket 32 and in a direction away from panel 22. It is preferred that shaft 84 extend from surface 38 in a direction substantially perpendicular to panel 22. Channel 40, in a preferred embodiment, becomes substantially narrowed and located to the outboard side of gasket 32 as it extends around the location of stud 82. If desired, a fastener may be attached to stud 82 on the opposite side of pinch flange 31, to pull gasket 32 tightly against pinch flange 31 and retain panel assembly 20 in place. As in the previous embodiments, a bead of adhesive 58 may be located either outboard or on gasket 32 to help retain and seal the panel assembly within window opening 31.

Figure 10:
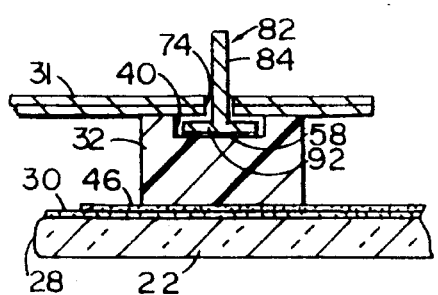
Figure 11:
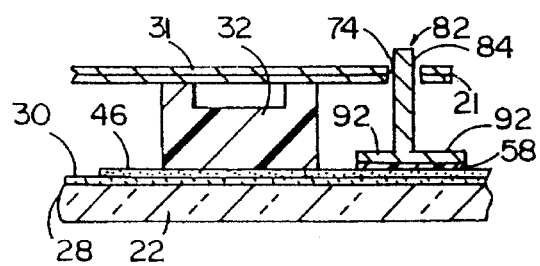
Figure 12:
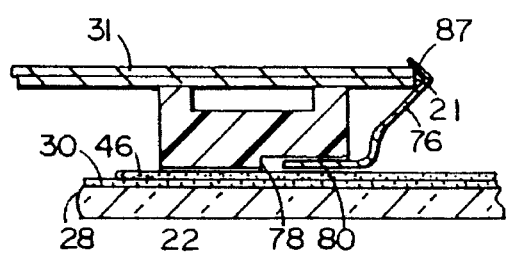

FIGS. 10–12 illustrate alternative types and locations of mounting hardware which may be used in association with the inventive panel assembly 20. FIG. 10 illustrates a stud or locating pin 82 positioned with head 92 seated in gasket channel 40 and retained by a thin bead of adhesive 58. The shaft 84 extends from channel 40 away from panel 22 and is received in a hole 74 in pinch flange 31. A speed nut or other fastener (not shown) may be received along shaft 84 to pull gasket 32 against flange 31.

Figure 8:
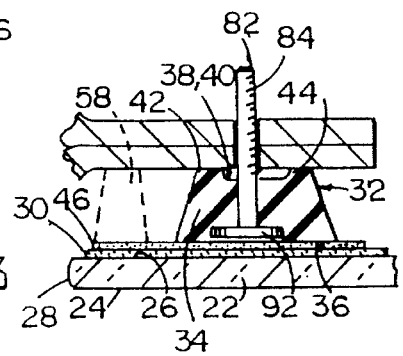
FIGS. 6–12 are fragmentary sectional views of alternate embodiments of the panel assembly taken along lines VI—VI and VII—VII shown in FIG. 1.
Figure 9:
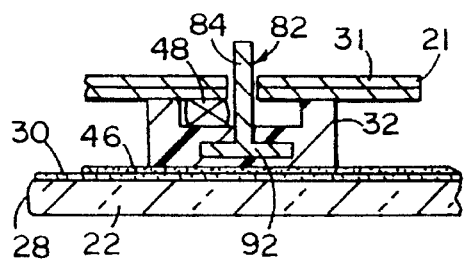

Advantages offered by the location of the locating or mounting hardware, such as shown in FIGS. 8–10, is the ability to securely fasten panel 22 within opening 21 without encroaching into the viewing area or increasing the panel size. In those situations where these factors are not as critical, the locating and mounting hardware (FIG. 11) may be located either inboard or outboard of gasket 32. As shown in FIG. 11, stud 82 is bonded directly to frit layer 30 inboard of gasket 32 using a suitable adhesive such as 58. In the alternative, stud 82 may be bonded as described in U.S. patent application Ser. No. 874,635, now United States Patent (Donnelly P-527), which is incorporated herein by reference.

As an alternative to studs 82, clips 76 may be used as shown in FIG. 12. Gasket 32 is preferably substantially the same as that described above with the exception that a cavity 78 is formed between gasket 32 and panel surface 26, primer layer 46, or frit layer 30. Cavity 78 receives one end 80 of a metal or plastic spring clip which is retained therein. An opposite end 82 of clip 76 extends away from both gasket 32 and panel surface 26 to engage the edge of pinch flange 31 which forms window opening 21.

The above embodiments of panel assemblies offer several advantages over prior known structures. These advantages include a weight reduction in the gasket by as much as two-thirds over prior three-sided, encapsulated assemblies. The substantial reduction in weight is achieved by using less material to form gasket 32. As a result, panel assembly 20 is less costly to manufacture. Another advantage is that the panel assembly is manufactured in less than half the cycle time of many prior panels. The reduced cycle time results in more units being produced in a given period. Another advantage associated with the invention is the ability to mold gaskets having variable cross sections, depending upon the desired application. If cross sections are desired which have undercuts, it is contemplated that this invention may be easily incorporated with the inventions described in U.S. patent application Ser. No. 897,764, filed Jun. 12, 1992, now U.S. Pat. No. 5,331,784, and Ser. No. 898,094, filed Jun. 12, 1992, both of which are incorporated herein by reference and are assigned to the assignee of the instant invention.

MOLD APPARATUS

FIGS. 13–18 illustrate one embodiment of a preferred mold assembly 100 of the present invention used in manufacturing the panel assemblies described above. Mold assembly 100 is preferably a three-plate mold having a three-plate action which is well known in the industry. The three-plate mold contemplated by this invention may be mounted in any one of a number of presses, including vertical and horizontal shuttle-type presses having clamping pressures on the order of 50 tons or greater.

Mold assembly 100 includes a fixed plate 102, an intermediate ejector plate 104, and a cover plate 106. Fixed plate 102 (FIG. 15) is preferably formed from a wear-resistant steel alloy and includes a bottom or lower surface 108, and an upper or top surface 110, both generally rectangular in shape. A guide pin 112 is preferably fixed in a hole 114 located in each corner and extends from surface 110 to engage alignment holes in ejector and cover plates 104, 106, respectively. Located immediately adjacent each guide pin at opposite ends of fixed plate 102, and formed in surface 110, are threaded holes 116 for receiving a threaded bolt 118. Each bolt 118 retains a bushing 120 for guiding ejector plate 104 toward and away from fixed plate 102. A recess or hole 122, extending into fixed plate 102 from surface 110, and opposite a matching hole 124 in ejector plate 104, retains a spring 126 for forcing ejector plate 104 away from fixed plate 102 upon the release of the clamping pressure. These springs may be located at the same ends of plate 102 as guide pins 112 and inboard of guide bushings 120.

Located in the central portion of fixed plate 102 is a nozzle bushing 128 disposed in a shouldered hole 130 extending through plate 102 and fixed therein by a plurality of equispaced bolts 132. A hemispherical seat 134 defined at one end is adapted to receive a nozzle from the injection-molding machine (not shown). A spree or injection port 136 extends from seat 134. Tapered toward surface 108, spree 136 extends through nozzle bushing 128 and terminates at surface 110 of plate 102. Extending radially from the end of nozzle bushing 128 are a plurality of runners 138 machined in surface 110 terminating at their outer reaches in a depression 140 containing an angularly upstanding runner-retaining peg 142 (see also FIG. 13). Fixed plate 102 has surface 108 held tightly against a platen (not shown) in a conventional manner over an injector nozzle (not shown) by locator bushing 144 received within bushing recess 146.

Figure 13:
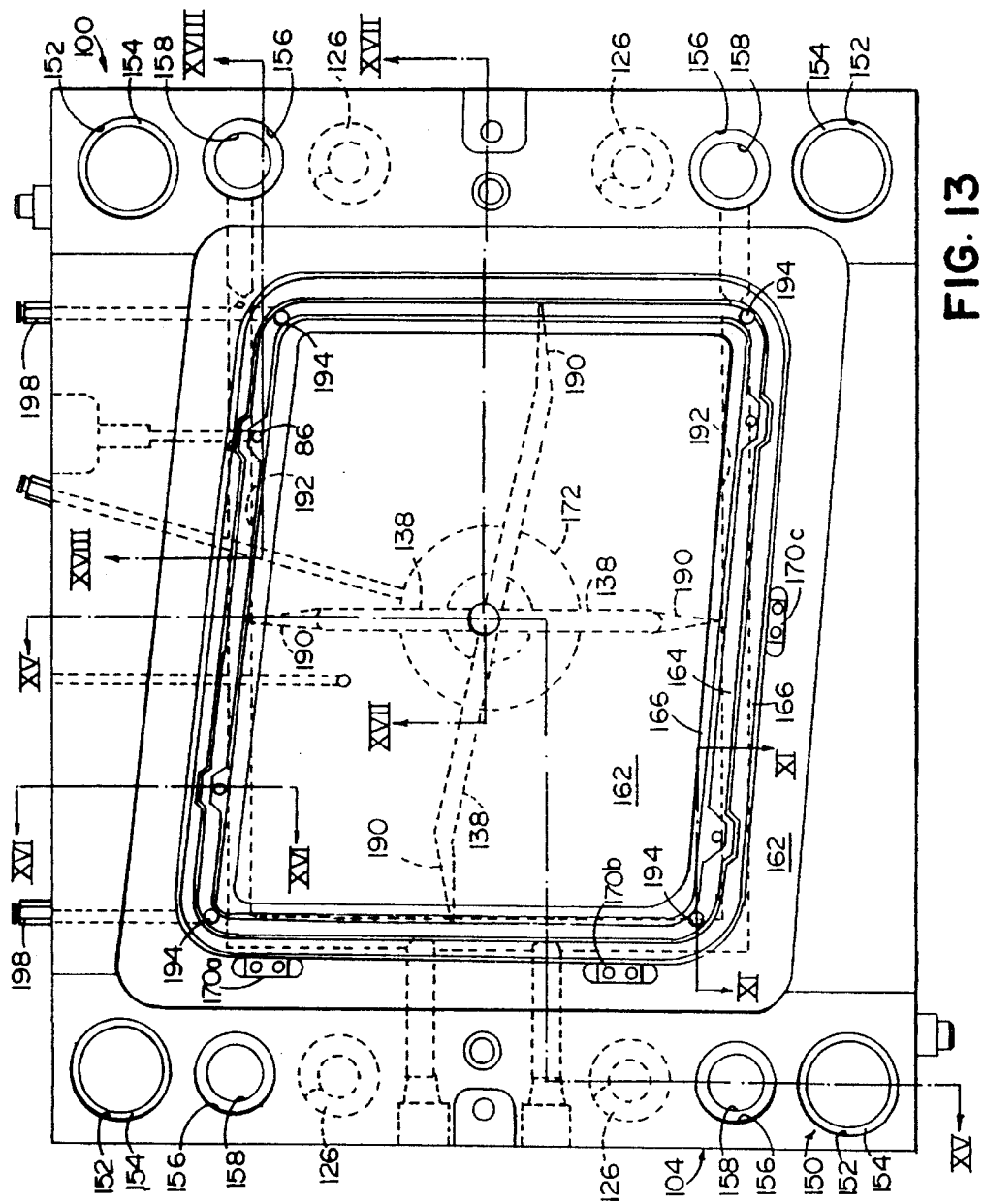
FIG. 13 is a plan view of one half of a mold assembly of the present invention.
Figure 14:
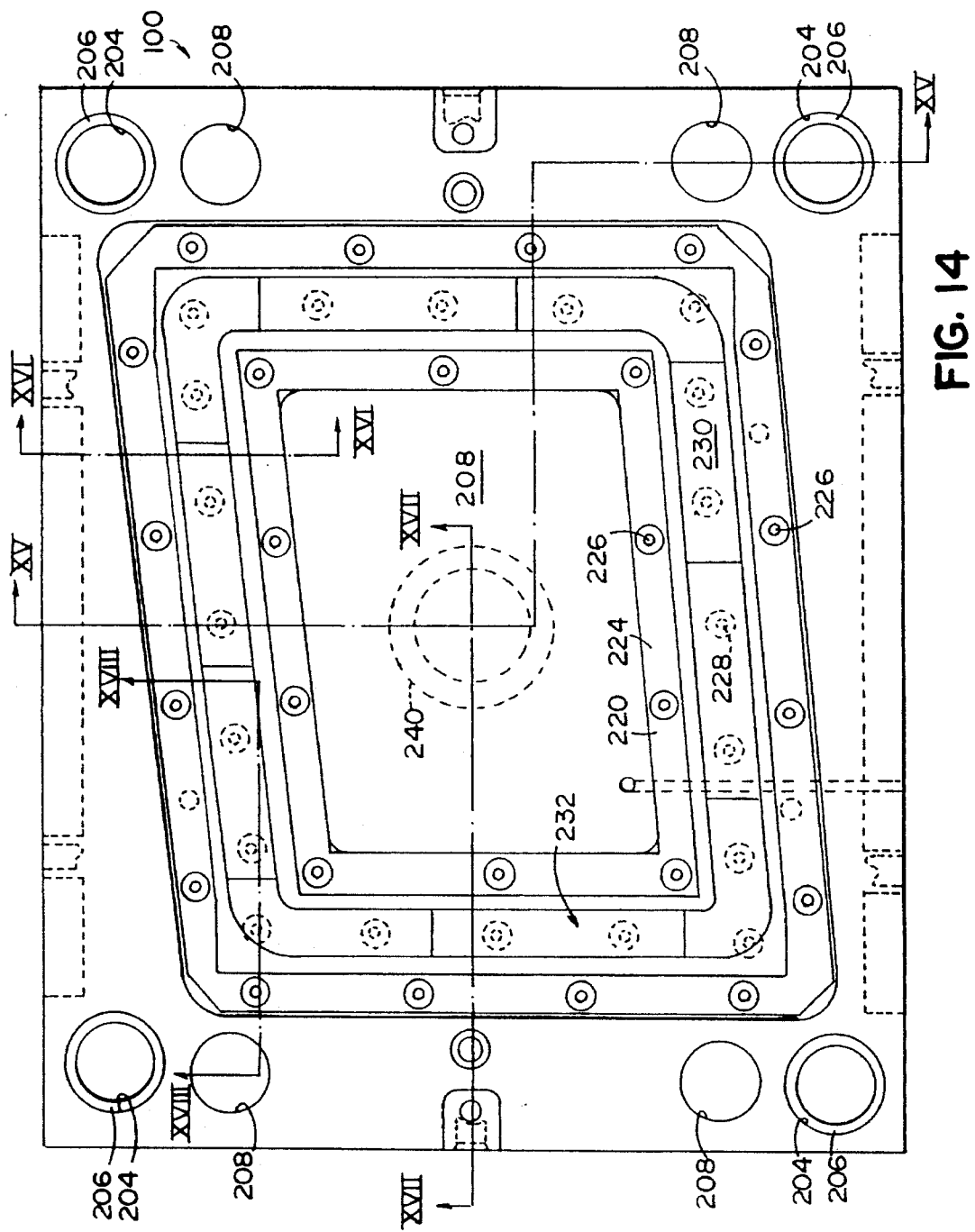
FIG. 14 is a plan view of an opposite half of the mold assembly of the present invention.
Figure 15:
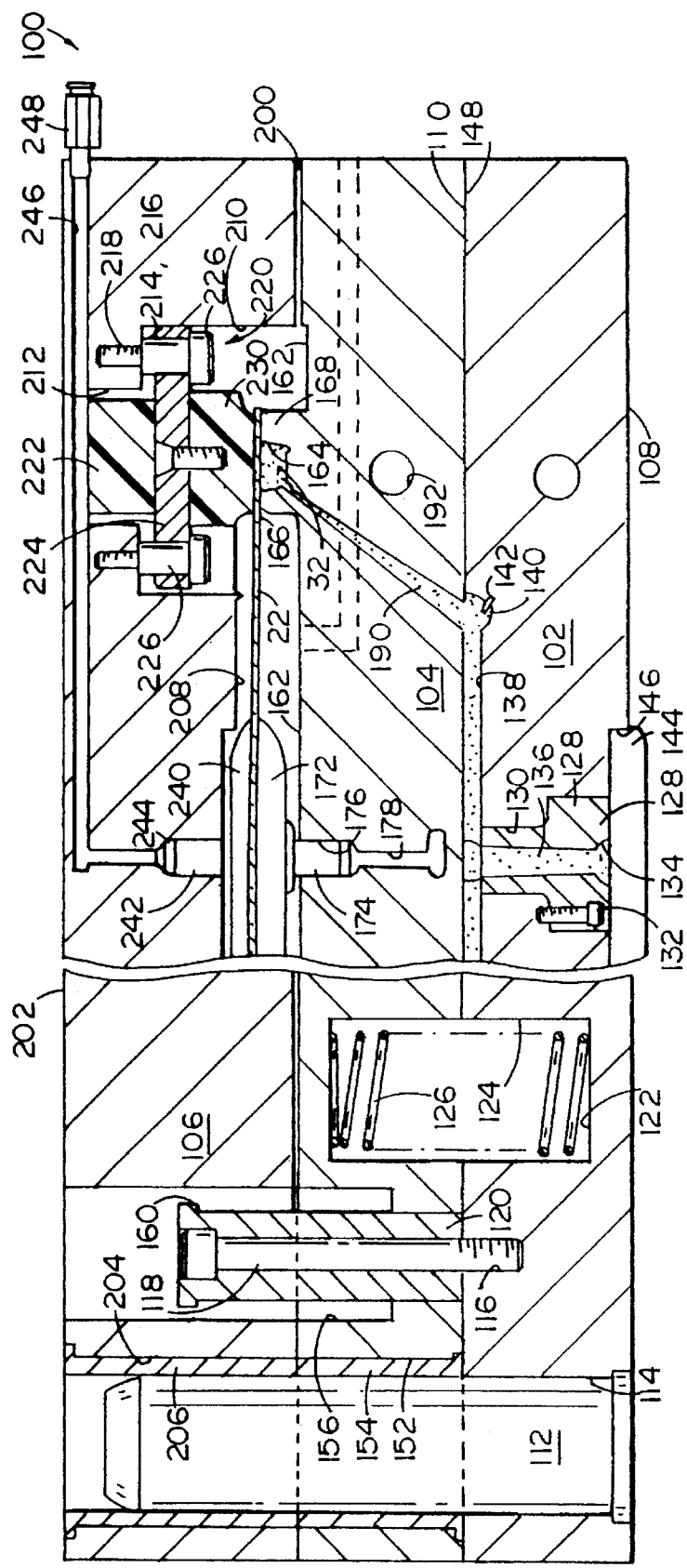
FIG. 15 is a section view through the mated mold halves taken along line XV—XV shown in FIGS. 13 and 14.

Ejector plate 104, shown in FIGS. 13 and 15, is also tabular in form and substantially the same shape as fixed plate 102. Made from the same material, ejector plate 104 includes a lower surface 148 adapted to mate and seal with face 110 of fixed plate 102, and an upper surface 150 which faces cover plate 106. Ejector plate 104 includes a hole 152 located at each corner and lined with a bushing 154 to receive guide pins 112 extending from fixed plate 102. Adjacent each guide hole and bushing 152, 154 is a second hole 156 having a reduced diameter shoulder 158 to glide along bushing 120 retained by bolt 118. In this configuration, ejector plate 104 is moved uniformly toward and away from fixed plate 102 along guide pins 112 in bushing 154 and hole 156 along bushings 120. The maximum separation between ejector 104 and plate 102 is controlled by shoulder 160 on bushing 120 engaging shoulder 158 in hole 156. As mentioned briefly above, ejector 104 is automatically moved away from plate 102 by springs 126 disposed in opposing cavities 122 and 124 when clamping pressure is released.

The upper surface 150 of ejector 104 is machined to produce a relief 162, mold cavity 164, and a cavity shut-off area or surface 166. Mold cavity 164 and cavity shut-off 166 are formed in an upstanding ridge 168 on ejector surface 150. Mold cavity 164 machined in ridge 168 is the negative image of gasket 32 to be molded. An advantage offered by this cavity design is that the only area which requires detailed machining and polishing is the relatively small area of the cavity shut-off surface 166 along the top of ridge 168. Shut-off surface 166 is the only portion of ejector plate 104 which receives and supports glass or other panel 22. Since a relatively small shut-off area 166 engages panel 22, fewer panels are likely to break during the molding process because of tolerance differences in the panels. In addition, mold assembly 100 is less expensive to manufacture because there is less surface area requiring detailed machining to conform to the surface shape of the panels. If it is desired to encapsulate and mold-in locating or mounting hardware, a fastener retention device may be located at the bottom of mold cavity 164. For example, if locating and mounting studs, such as described above, are to be molded and encapsulated within gasket 32, a fastener retention device such as 86 is retained in a sink 88 formed in the bottom of mold cavity 164. Barrel 86 includes a magnet 90 located at one end to magnetically retain a shaft 84 of the locating and mounting stud 82. The exact location of the retention device 86 and the manner in which it retains the mounting hardware is dependent upon the desired location of the mounting hardware within the mold cavity.

Figure 17:
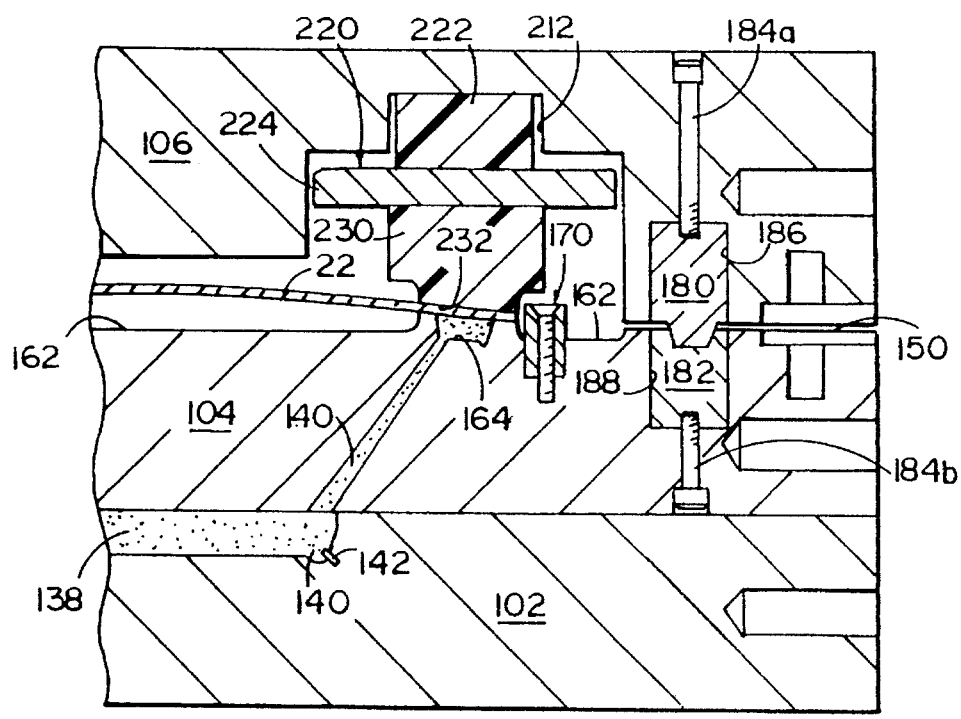
FIG. 17 is a fragmentary section view of the mated mold assembly taken along lines XVII—XVII shown in FIG. 14.

To locate each panel 22 on shut-off surface 166 and mold cavity 164, several locating techniques may be utilized. In a first embodiment, shown in FIGS. 13 and 17, a plurality of metal or plastic panel locating pins 170 are mounted to surface 150 outside of ridge 168 and within the relief 162 machined in surface 150. Pins 170 engage peripheral edge 28 of panel 22 and precisely locate the panel on surface 166 over cavity 164. It is preferred that two such locating pins 170a, 170b be located along one edge or portion of ridge 168 while a third locating pin 170c be located along an adjacent side or portion to support panel 22 along at least two sides. Once panel 22 is located above mold cavity 164 by pins 170a–170c, panel 22 may be held tightly in place by a suction pad 172 centrally located in relief 162 to the interior of ridge 168. Suction pad 172 has a vacuum end 174 fixed within one end 176 of a vacuum port or passage 178 machined in ejector plate 104. Port 178 is, in turn, coupled in fluid communication to a vacuum source to create a vacuum between cup 172 and panel 22. It is preferred that vacuum cup 172 be used when manually locating panels 22 on mold cavity 164 and shut-off surface 166. In an alternate embodiment of locating panels 22, a robotic arm (not shown) adapted for transporting panel 22, may have a locating pin on the arm to engage a female liner located at a predetermined point on ejector surface 150. For example, FIG. 17 illustrates male locating pin 180, and a female liner 182, respectively, which are retained by bolts 184*a*, 184*b* in opposing cavities 186, 188 in the cover plate 106 and ejector plate 104, respectively. Female liner 182 in plate 104 consistently provides a reference point with respect to mold cavity 164 which may be engaged by a pin on a robotic arm.

To provide an avenue for the injected material from radially spaced runners 138 to mold cavity 164, a plurality of dedicated gating drops 190 (FIGS. 13 and 15) are machined in ejector 104. Each gating drop 190 extends downwardly from an approximate midpoint in each segment of mold cavity 164 and terminates at a point on the bottom surface 148 of ejector 104 which is directly opposite a depression 140 at the terminus of each runner 138. Thus, each runner 138 and its dedicated gating drop 190 provides a path for the injected material to mold cavity 164.

Ejector plate 104 also may contain one or more conduits or passages extending therethrough. For example, one or more passages 192 (FIG. 13) may be machined in ejector 104 at a predetermined distance directly below or adjacent mold cavity 164. Passages 192 are interconnected in fluid communication with each other in a well known manner to a fluid source external mold assembly 100 for circulating a conditioned fluid therethrough. One reason for circulating the fluid would be to maintain a temperature range in the mold assembly and particularly mold cavity 164. In one embodiment, it is preferred to circulate a fluid, preferably water, through ejector plate 104 to maintain a mold cavity temperature between 70° and 190° F., preferably 75°. This substantially constant temperature of ejector plate 104 provides the best flow characteristics for the preferred thermoplastic PVC described above.

A plurality of ejector or poppet pins 194 (FIGS. 13, 16 and 18) are located in the bottom of mold cavity 164. For a generally rectangular mold cavity 164, it is preferred that one popper pin 194 be located at each of the four corners. Each popper 194 is preferably driven by compressed air through a network of air passages 196 extending through ejector plate 106 and coupled in fluid communication through nipple 198 to a source of pressurized air (not shown). Each poppet pin 194, upon the application of air pressure, pushes the finished molded gasket upwards against panel 22 and out of mold cavity 164 to assist in removing the finished assembly 20 from mold assembly 100.

Overlying and retaining panel 22 against shut-off surface 166 during the molding process is cover plate 106 (see FIGS. 14–18). Cover plate 106 is also tabular in form and of substantially the same shape as both ejector plate 104 and fixed plate 102. Also made from a wear-resistant steel alloy typically used in injection molding tools, cover plate 106 includes a lower surface 200 which faces but does not engage surface 150 of ejector plate 104 and is described in greater detail below, and an upper surface 202 which is mated against the opposite platen or pressure plate (not shown) of the injection press. Extending through the corners of cover 106 are guide bushing holes 204 lined with a bushing 206 substantially identical to holes 152 and bushings 154 described above. As with bushing 154, bushing 206 is aligned with and receives guide pins 112 when the three plates are pressed together. Adjacent each hole 204 and toward the centerline of cover plate 106 is a hole 208 which receives the distal end of bolt 118 and bushing 120 when mold assembly 100 is closed.

The lower surface 200 of cover 106 has been machined to form a relief 208 for accommodating panel 22 and several additional components. More specifically, surface 200 includes a pair of channels 210, 212 wherein channel 212 is defined in the bottom 214 of channel 210. The configuration of channels 210, 212 is substantially a mirror image of the layout of ridge 168 protruding from ejector plate 104 for reasons which will be more apparent below. The bottom 214 of channel 210 also services as a shoulder 216 on each side of channel 212, containing a plurality of threaded holes 218 spaced at predetermined intervals.

Disposed in channels 210, 212 and designed to engage surface 24 of panel 22 directly opposite mold cavity 164 is a pressure pad assembly 220 (FIGS. 15–18). Assembly 220 further includes a polymeric pressure pad 222 disposed in and slightly extending from channel 212. It is preferred that pressure pad 222 be segmented and be placed end-to-end to extend around substantially the entire length of channel 212. In this manner, if a particular segment becomes worn or fatigued, the entire pad 222 need not be replaced. In the preferred embodiment, pressure pad 222 is an alloy of urethane such as that designated GC975 available from Gallagher Corp. of Gurnee, Ill. Pressure pad 222 is preferably retained in channel 212 by a floating plate 224 shaped to fit freely within channel 210. Plate 224 is suspended by a plurality of shoulder bolts 226 extending through the peripheral edge of plate 224 and received by holes 218 in shoulders 216. The heads of bolts 226 retain plate 224 against pad 222 while the shaft of bolts 226 allow movement of plate 224 between shoulders 216 and the heads of bolts 226.

Retained on the opposite side of floating plate 224, by bolts 228 extending through plate 224, is a heat insulative and rigid polymeric pad 230. Pad 230 preferably includes a plurality of segments placed end-to-end along floating plate 224 in a shape directly opposing, but wider than, mold cavity 164. One surface 232 of pad 230 has been milled or machined so as to conform, as closely as possible, to the surface contour of panel surface 24, to force panel 22 and panel surface 26 against cavity shut-off area 166 defined along ridge 168. In a preferred embodiment, pad 230 is made from polyethylene terephthalate (PET) available from Ryerson Plastic of Chicago, Ill. The PET material of pad 230 provides excellent heat insulation, is somewhat resilient and of moderate wear durability. Another advantage of using PET is that is may be molded to conform to the shape of a panel surface, thus avoiding the need to machine surface 232.

Another material which may be used instead of PET is polyether etherketone (PEEK) available from Ryerson Plastic of Chicago, Ill. PEEK provides better heat insulation, but is less resilient, although it has better wear characteristics than PET. However, PEEK is more expensive and somewhat more difficult to machine.

Located toward the center of surface 200 in relief 208 surrounded by channels 210, 212, is a suction pad 240 substantially identical to suction pad 172 described above. Pad 240 has a first end 242 retained in a suction port 244 extending into cover plate 106. Port 244 is, in turn, placed in fluid communication with a vacuum source (not shown) through passage 246 and nipple 248. It is contemplated that panel 22 can be loaded against cover plate 106 before closing of mold assembly 100. Location of panel 22 may be had with respect to cover plate 106 using locating pins or using robotic placement such as described above. In another application, suction pad 240 may also be used to remove panel assembly 20 from ejector plate 104 with the aid of ejector pins 194 disposed in the bottom of mold cavity 164.

Cover plate 106 may also contain one or more conduits or passages 250 interconnected in fluid communication with each other and to a fluid source external to mold assembly 100. The fluid circulated through passages 250 preferably maintains the temperature of cover 106 at substantially the same, or generally close to, the temperature of ejector plate 104, with the two components of substantially the same temperature, binding or misalignment between the components caused by expansion or contraction is minimized.

HEATING

Figure 19:
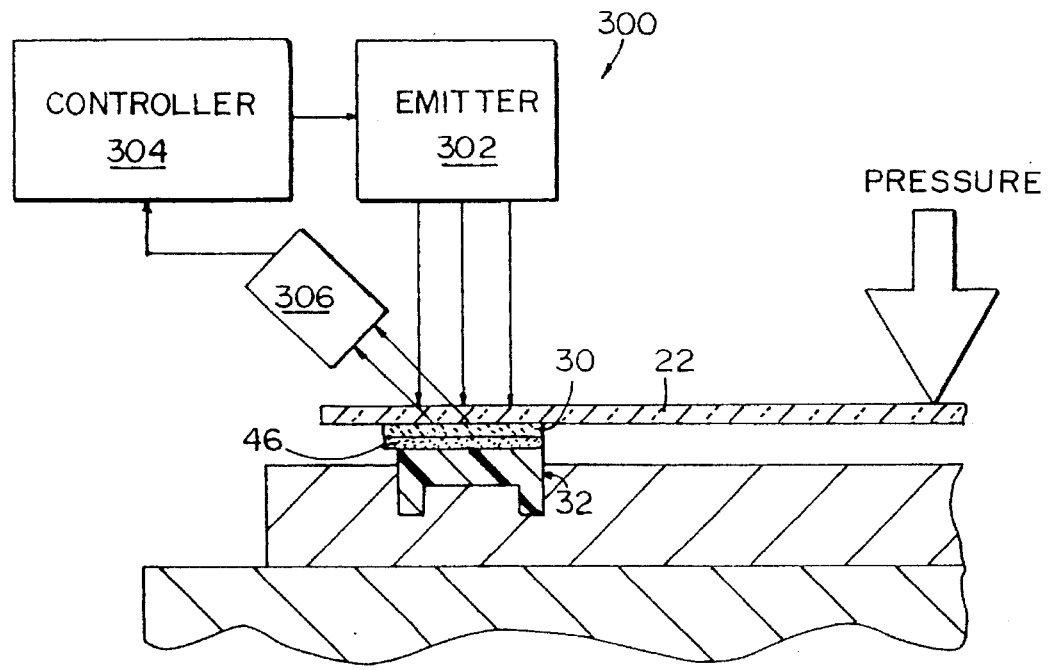
FIGS. 19 and 20 illustrate two examples of energy sources used for heating in association with the method of the invention.
Figure 20:
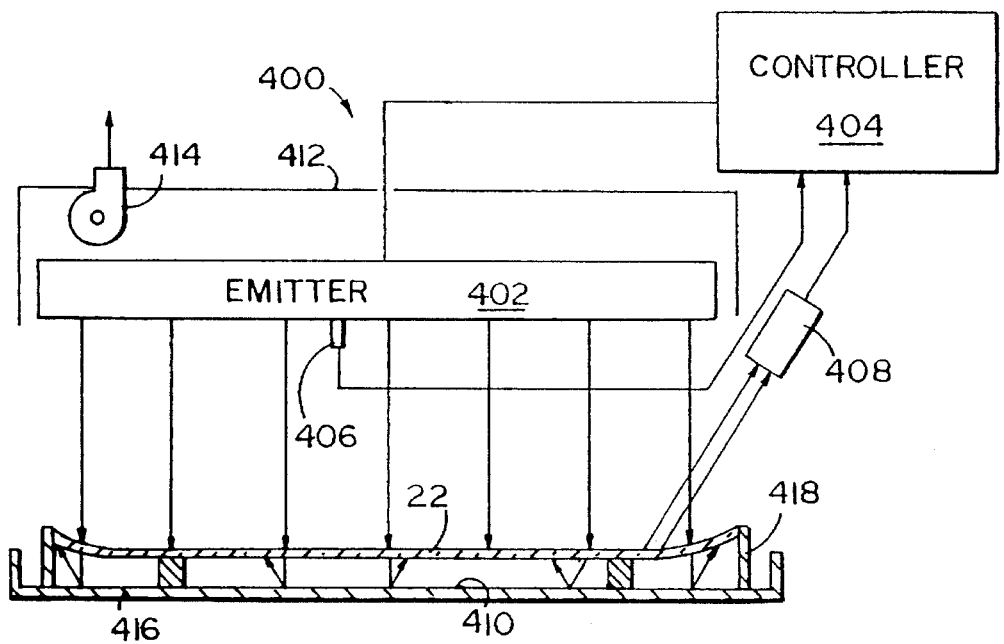

FIGS. 19 and 20 are schematic representations of two energy sources that may be used in conjunction with molding assembly 100 described above to heat the panel 22 after ceramic frit layer 30 and primer coating 46 are applied. Although each source is described in relation to producing a particular energy spectrum, such is by way of example only. Other heat energy sources may be equally effective such as convective, conductive, inductive and resistive heat sources. Moreover, microwave energy may be used equally as well. In a preferred embodiment, energy sources shown in FIGS. 19 and 20 are located immediately adjacent to mold assembly 100. In this manner, panels do not need to be transported very far before being loaded in mold assembly 100, as described more fully below. Thus, heat is retained and the high temperature necessary for molding to produce the improved adhesion of this invention is maintained.

FIG. 19 generally illustrates a controlled focused infrared (CFIR) source 300 which may be used either to dry the adhesive primer after it has been applied to panel 22, or to preheat panel 22 prior to molding of gasket 32 on panel 22, after the primer is applied over frit layer 30. Infrared source 300 includes one or more infrared emitter assemblies 302 such as Model 5305-104 made by Radiant Energy Research, Inc. of Minneapolis, Minn., and disposed above sheet 22 in a pattern conforming to that region of sheet 22 adapted to receive gasket 32. In the alternative, a single infrared emitter assembly may be moved above sheet 22 by a guided robotic arm in a pattern conforming to that area to receive gasket 32. A computer/process controller 304 preferably causes infrared emitter assembly 302 to emit infrared energy into sheet 22 from a side opposite that containing frit coating 30 and adhesive primer coating 46, although it may be directed from the same side as the frit and the primer. A spectrophotometer 306 coupled to computer/process controller 304 detects the energy reflected and radiated from sheet 22. Based upon the feedback from spectrophotometer 306, controller 304 adjusts the power of infrared energy emitted by assembly 302 to obtain maximum absorption by frit layer 30 and primer coating 46. Absorption of infrared energy by frit layer 30 generates heat, preferably raising the temperature of frit layer 30 and primer coating 46 to more than 250° F. A preferred temperature is within the range of 250° to 450° F. for the preferred primer described above.

Alternately, the entire area of panel 22 can be heated. FIG. 20, schematically illustrating a controlled area infrared (CAIR) source 400, may include one or more infrared emitters 402 such as Model FB122425B3 made by Casso-Solar Corp. of Pamona, N.Y., and may be distributed above and aligned with sheet 22. Radiation generated by emitter 402 is controlled by a controller 404 based upon input from a thermocouple 406 attached to emitter 402, and a spectrophotometer 408 angularly disposed with respect to sheet 22. A reflector 410 may be disposed beneath sheet 22 to reflect heat energy back into the sheet or panel. Panel 22 may be supported above reflector 410 by insulator blocks or spacers 416 to prevent heat loss by conduction into reflector 410. Contemplated in both of the heating options, but shown only in FIG. 13, is a plenum 412 and an exhaust fan 414, to vent fumes driven off during the heating process. Moreover, each sheet 22 may be properly located with respect to each heating source by using a template or guide for either the panel or sheet such as 418.

Since the radiation produced by emitters 302 and 402 preferably is introduced into sheet 22 from a side opposite that containing primer coating 30, it is preferred that sheet 22 have a high transmissivity to the wavelength of radiation selected. Emitters 302 and 402 both are capable of producing infrared radiation having a wavelength greater than $7.0 \times 10^3$ Angstroms (Å). The transmissivity of the radiation through each sheet is greatly effected by its particular characteristics. For example, tinted or opaque panels may have a lower transmissivity since the pigments or coloration within the material may absorb a portion of the radiation. For materials having lower transmissivities, it is preferred to select wavelengths of radiation which promulgate better through these materials, yet are absorbed by the frit layer. In the preferred embodiment of this invention, panel 22 is a transparent glass sheet and may be a single sheet or laminated sheets, depending upon the desired function of the panel assembly.

In order to reduce problems associated with heating and cooling large expanses of glass or plastic panels, each of the above radiation sources may direct their energy to a restricted portion of the panel or sheet. For example, since it is desired to heat only that portion of the frit adapted to receive gasket 32, each energy source 302, 402, may be adapted so that the radiation is applied only to that area. Alternatively, each source may be moved around the sheet by a guided robotic arm, or a mask may be used to limit the exposed area.

METHOD

Figure 21:
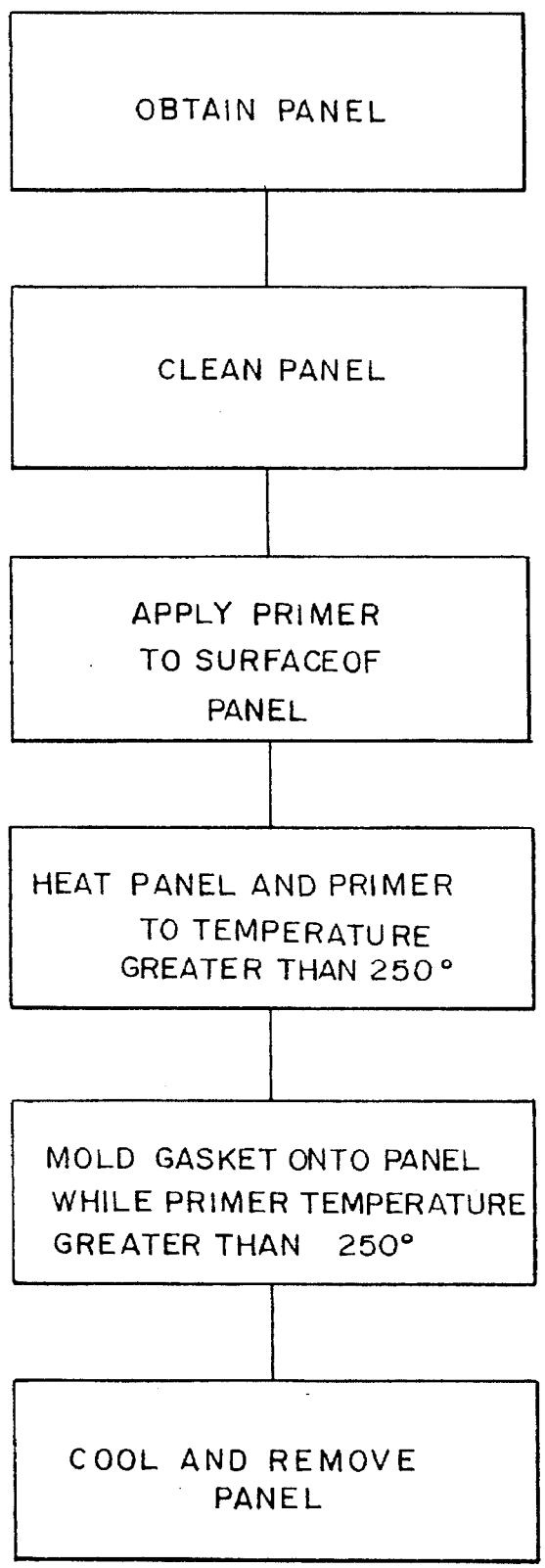
FIG. 21 is a flow diagram illustrating one embodiment of the method of this invention.
Figure 22:
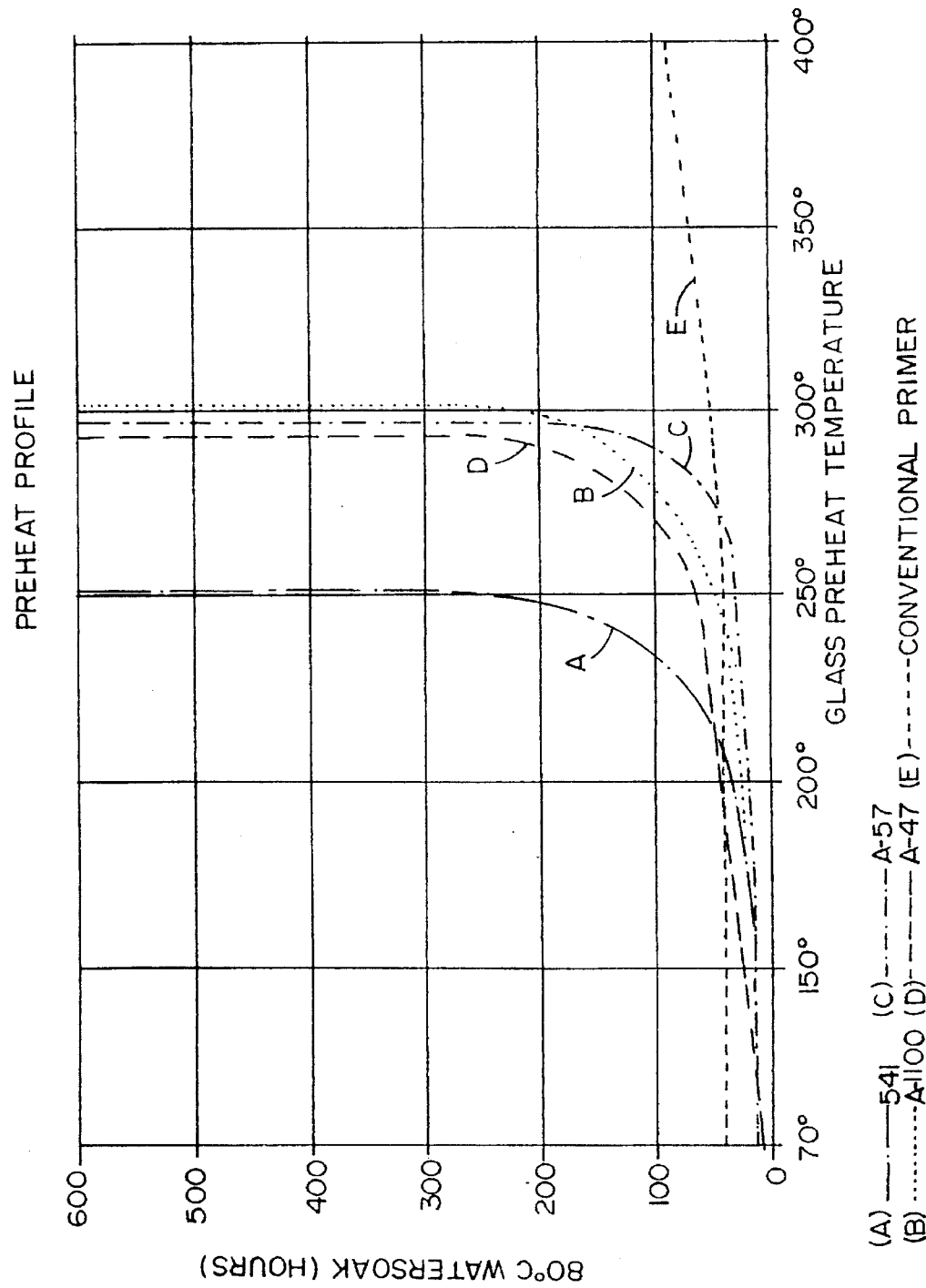
FIG. 22 graphically illustrates the adhesion characteristics of several adhesive primers used in the invention.

Referring to FIGS. 21 and 22, panel assembly 20 described above is manufactured according to a method which results in superior adhesion of gasket 32 to a single surface of panel 22 on frit layer 30 and produces a bond substantially impervious to invasion by water. The adherence obtained between gasket 32 and panel 22 withstand shear forces greater than 300 pounds and 180 degree peel tests of more than 30 pounds per liner inch after soaking for at least 250 hours in 175° F. (80° C.) water. It is preferred that any failure occurs in the cohesiveness of the gasket instead of at the bond between the panel and gasket.

Once panel 22 has been obtained with or without frit layer 30 applied to surface 26, the surface of panel 22 to receive the gasket is cleaned. The preferred cleaning technique is by wiping with a isopropyl alcohol which removes oils or other dirt and debris. The alcohol mobilizes any contaminants and evaporates in a short period of time leaving substantially no residue to interfere or degrade the process.

Following cleaning of panel 22, and after sufficient time has lapsed to evaporate any remaining solvent, primer adhesive 46 is applied to that portion which will be receiving molded gasket 32, and preferably to a slightly larger area. With respect to the embodiments having a gasket such as 32, it is preferred that application will be constrained to a linear path on frit layer 30 proximate peripheral edge 28 having a thickness within the range of 0.01 and 1.0 mils. For gaskets such as 70 shown in FIG. 7, application will be constrained to a linear path along surface 24 without frit layer 30, but of the same thickness and also proximate peripheral edge 28.

Primer adhesive 46 is preferably Donnelly A-57 which may be applied by a spray, wiper, roller extruder or other technique to the preferred thickness. Since it is anticipated that use of this invention will typically involve production of a large number of panels, an automated application technique is preferred. One automated process is by a robot applicator which extrudes a precise coat of primer adhesive 46 to a defined portion of panel 22. To accurately reproduce the robotic application of primer adhesive 46, conventional robotic devices require accurate positioning of panel 22 in reference to the robotic applicator.

Following the application of primer coating or layer 46, a silane coupling agent such as Dow Corning's aminoalkyl functional silane Z-6020 may be wiped over primer coating 46. In the alternative and saving an extra step of wiping, the silane coupling agent may be premixed with primer adhesive 46. As mentioned above, the ratio, by weight, of epoxy component to silane is greater than 1 and most preferably approximately 1.7. The presence of the silane coupling agent improves the adhesive character of the primer.

Subsequent to the application of primer adhesive 46 and any silane coupling agent, it is preferred CAIR heater 400 be used to heat frit layer 30 and primer adhesive 46 to a temperature greater than 250° F. and, most preferably, to a temperature between 250° F. and 350° F., usually 325° F. By heating to about 325° F., sufficient heat is retained in panel 22, primer 46 and frit layer 30 so that the temperature will be above 250° F. after transfer of panel 22 from CAIR source 400 to mold assembly 100 and during the molding process. Using CAIR source 400, it is contemplated that the dwell time to achieve a temperature of panel 22 within that range to take as long as 20 seconds.

It has been found that by heating panel 22 and adhesive primers 46 of Table I to a temperature greater than 225° F., and maintaining that temperature up through the time gasket 32 is molded onto panel 22, an exceptionally strong bond and water resistive barrier is formed between panel 22 and gasket 32. The minimum temperature for each of the primer adhesives 46 shown in Table I at which such a bond occurs is known as the "primer transition temperature". The "primer transition temperature" may also be defined as that temperature for a given primer where the adhesive quality significantly changes. A better understanding of this adhesive characteristic and definition may be obtained by referring to the graph shown in FIG. 22.

FIG. 22 graphically represents the results of experiments using the primers in Table I in bonding a gasket to a single surface of a glass panel 22 having a frit layer 30 thereon. The abscissa or X-axis is a plot of the temperature to which panel 22 and each primer 46 was heated to and generally maintained at the time gasket 32 was molded thereon. The ordinate or Y-axis of the graph is the number of hours the gasket survived shear and peel tests after soaking in water having a temperature of 80° C. Points were plotted when the cohesive character of the gasket failed, but not if bond between panel and gasket failed. Cohesive failure occurred when 80 percent or more of the gasket was retained on the panel when subjected to both shear and 180 degree peel tests. Presently, the most stringent standard known to be followed by any automobile manufacturer is 100 hours. That is, the bond between a gasket and panel should survive a minimum of 100 hours in the 80° C. watersoak.

To provide consistent results, shear tests were conducted on gaskets bonded to a glass plaque, each gasket having a length of approximately 1.0 inch, 0.75 inch wide, and 0.50 inch thick. The shear tests were conducted transversely to the long axis of the gasket at a rate of 25 millimeters per minute. Peel tests were conducted on gaskets 0.75 wide, 0.50 thick and of a length sufficient to pull one end 180° back along the gasket at a rate of 25 millimeters per minute.

As seen in the graph, substantially every adhesive primer has an improved adhesive quality at a temperature above 225° F. with the exception of conventional water-based PVC primers (curve E). For the adhesive primer designated A-1100 (curve B), a noticeable increase in the slope of the curve occurs around 250° F., and the slope shows another significant change around 290° F. The adhesive primer designated A-47 (curve D) follows a similar curve as does the preferred adhesive primer A-57 (curve C). Adhesive primer EXP 541 (curve A) obtains its maximum adhesion when heated to approximately 250° F., but shows a noticeable change in the slope of its curve at approximately 200° F.

Figure 16:
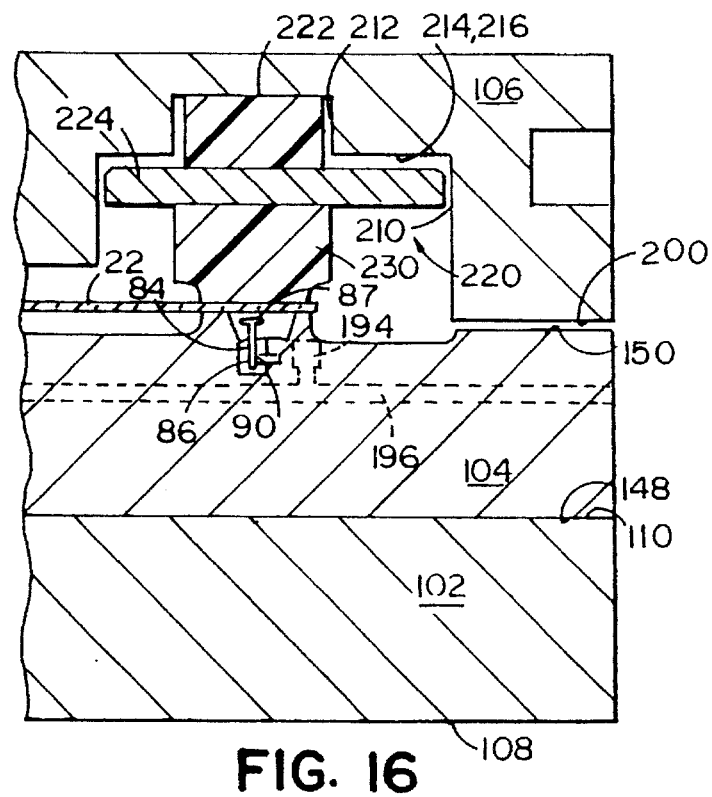
FIG. 16 is a fragmentary section view of the mated mold halves taken along line XVI—XVI shown in FIGS. 13 and 14.

Referring again to FIG. 20, immediately following heating of panel 22, frit layer 30 and adhesive primer 46 to a temperature greater than or equal to the primer transition temperature, panel 22 is transported frown CAIR 400 and loaded into mold assembly 100 in the manner described above, and the mold is closed. One option available in the method before loading panel 22 is to load the locating or mounting hardware in mold cavity 164 so that it will be positioned and/or at least partially encapsulated by the molded gasket 32. Referring to FIGS. 12 and 16, one method for encapsulating the hardware is shown. In one example, locating and mounting studs 82 include a shaft portion 84 which is received within a barrel 86 retained in a sink 88 formed in the bottom of mold cavity 164. To retain shaft 84 in barrel 86, a magnet 90 is located at one end to magnetically retain shaft 84 therein. In this fashion, it is preferred that the stud dimension is such that the remaining portion of the shaft 84 including stud head 92 is long enough to be located in mold cavity 164, but not so long as to contact panel 22 when mold assembly 100 is closed. Although magnetic retainers are disclosed, mechanical retainers may be used just as effectively to locate mounting hardware of various kinds in mold cavity 164.

As briefly mentioned above, it is contemplated that this invention will be implemented using automated machinery. Accordingly, a robotic arm will preferably remove panel 22 from CAIR 400, and according to a program, locate the panel in mold assembly 100. In a preferred procedure, panel 22 will be transported and located against pressure pad assembly 220 (FIG. 15) and retained by suction pad 240 by drawing a vacuum through passage 246. After panel 22 has been loaded, mold assembly 100 closes, placing primed frit layer 30 in intimate contact with shut-off surfaces 166 around mold cavity 164. Frit layer 30 on panel 22 overlies and closes mold cavity 164. Shut-off surfaces 166 and frit layer 30 form a substantially tight seal as a result of pressure pad assembly 220 forcing panel 22 against ejector plate 104. The heat in panel 22 is substantially retained since panel 22 only contacts heat insulating pad 230 and shut-off area 166. Because pad 230 is an excellent heat insulator, minimal heat loss in panel 22 occurs through radiation and conduction into shut-off surfaces 166, or into pad 230. To reduce such heat loss by panel 22, ejector plate 104 and cover plate 106 may be heated by a fluid passing through passages 192, 250 milled in each component. It is preferred that the temperature of the fluid passed through one or both of the cover and ejector plates 104, 106 be within the range of 70°–190° F., and preferably on the order of 75° F.

With panel 22 loaded in closed mold assembly 100, panel 22 is ready to receive molded gasket 32. Preferably, when using the VISTA brand PVC described above, the temperature of the PVC at nozzle 128 entering fixed plate 102 is between 350° and 410° F., and most preferably at approximately 380° F. At this temperature, it is anticipated that the time to inject the PVC into cavity 164 will take on the order of 0.5 second or less, and preferably 0.2 seconds so the PVC contacts panel 22 and primer 46 while they are still at or above the primer transition temperature. During this period, the molten PVC is passed through sprue 136, runners 138, gating drops 190 and substantially fills mold cavity 164 at a rate of approximately 40 ounces per second. Using a low stress PVC molding technique, a fill pressure in the range of 15–25 pounds per square inch gauge (PSIG), as measured in the mold cavity, is used. Using this technique, the primer transition temperature or greater is achieved along the entire length of the bonding interface between panel 22 and gasket 32.

Subsequent to the filling of mold cavity 164, the injected PVC is packed in cavity 164 for two or more seconds at a mold cavity pressure in the range of 70–80 PSIG. Packing assures that mold cavity 164 has been filled and allows the material to extend into every portion of the cavity. Following packing, pressure is maintained or held on the injection for approximately 2 to 3 seconds at a mold cavity pressure on the order of 55–65 PSIG melt pressure. Once the hold pressure period has lapsed, injection pressure is removed and the injected gasket 32 is allowed to cool, cure, or harden for approximately 20 seconds. Following partial curing of gasket 32, mold assembly 100 is opened. Just prior to opening, a vacuum is drawn on suction pad 240 which pulls panel assembly 20 away from ejector plate 104. Substantially simultaneously, air poppets 194, located in the bottom of cavity 164, are activated to push gasket 32 out from cavity 164. Pushing of gasket 32 and panel 22 away from ejector 104 helps reduce separation of the still curing gasket 32 from frit layer 30. When removed at this time, it is believed that the central core is partially molten while the outer areas have cooled sufficiently to cure and/or set up. Cycle time for the method is kept to a minimum when the assembly is removed from mold 100 at this stage of curing. Overall cycle time for the entire molding process is on the order of 25 seconds as compared to about 45 seconds for current three-sided PVC encapsulation methods. Once the panel assembly is fully removed from the mold, and gasket 32 fully sets up and cures throughout, the bond between it and panel 22 is extremely strong. Several different test results of the bond achieved using the A-57 adhesive primer preheated to a temperature of greater than 250° F. are provided in Table II below.

TABLE II

|  | Shear (lbs) | Peel (lbs) |
|---|---|---|
| 500 Hrs Saltwater Spray | 536.3 ± 25.1 | 104.8 ± 6.0 |
| 1000 Hrs Heat (175° F.) | 513.8 ± 22 | 119.7 ± 10.9 |
| 1000 Hrs Humidity (98–100% at 100° F.) | 464.5[1] | 102.5[1] |
| 240 Hrs Watersoak (80° C.) | 427.83 ± 29.69 | 87.17 ± 9.36 |
| 720 Hrs Watersoak (80° C.) | 532 + 13.9 | 41.5 ± 4.3 |
| 1500 Hrs Watersoak (40° C.) | 480.3 ± 5.1 | 116.0 ± 5.27 |

In addition to the test results set out in the above table, the bond between the gasket and panel has withstood the same order of shear force and peel strength tests for adhesion after soaking for more than 1,000 hours in 175° F. (80° C.) water.

With respect to the runners and gating in the above described mold assembly, injection time has been reduced and injection pressure lowered by increasing the number and size of gates and runners from the sprue to the mold cavity. The increase in the number and size of the gates and runners lowers the injection pressure which in turn results in a lower clamping tonnage for the mold assembly. With the reduction in clamping tonnage, panels are less susceptible to breakage when out of tolerance.

Once panel assembly 20 has been formed in mold assembly 100, an additional step may be followed to assure that the primer transition temperature is achieved while in contact with gasket 32, 70. In this additional step, assembly 20 is removed from mold assembly 100 and placed in a separate fixture containing one or the other of heating sources 300, 400 described above. The assembly 20 is located and heating source is activated so as to introduce radiation into panel 22 from a side opposite that receiving the gasket. The infrared energy is absorbed at the contact boundary between the gasket and the panel resulting in an increase in temperature. If a frit layer is present, the frit is heated. Preferably, the temperature of the frit or boundary is raised to a temperature greater than or equal to the primer transition temperature to mobilize the primer and further react with the gasket. It is preferred that the temperature is not so high so as to melt gasket 32, 70. Following the post heating, panel assembly 20 is allowed to cool and be moved on in the assembly process.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

We claim:

1. A panel assembly for closing a window opening in a vehicle and having a gasket on one surface thereof, comprising:

a glass panel having opposing first and second surfaces terminating in a peripheral edge;

a primer layer applied to a portion of one of said first and second surfaces, said primer layer having a transition temperature of at least 200° F. at or above which said primer layer exhibits improved adhesion properties for polymeric gaskets molded thereon at such temperatures; and a polymeric gasket molded on said portion of one of said first and second surfaces of said glass panel and bonded thereto by said primer layer when said primer layer is heated to a temperature equal to or greater than said transition temperature, said glass panel including said primer layer being preheated to a temperature equal to or greater than said transition temperature prior to the molding of said gasket.

2. The panel assembly of claim 1 wherein said polymeric gasket is a thermoplastic material.

3. The panel assembly of claim 2 wherein said thermoplastic material is a thermoplastic elastomer selected from the group including a thermoplastic rubber, a thermoplastic urethane, a thermoplastic olefin, and a thermoplastic vinyl.

4. The panel assembly of claim 3 wherein said thermoplastic vinyl is polyvinyl chloride.

5. The panel assembly as defined by claim 2, wherein said primer forming said layer includes an acrylic base and an epoxy component; said molded polymeric gasket including polyvinyl chloride.

6. The panel assembly as defined by claim 5, wherein said primer layer further includes a silane coupling agent.

7. The panel assembly as defined in claim 6 wherein said primer forming said layer has a ratio of epoxy component to silane coupling agent, by equivalent weight, of greater than 1.0.

8. The panel assembly as defined by claim 5, further comprising a silane coupling agent applied to said primer layer prior to molding of said gasket.

9. The panel assembly as defined by claim 2, wherein said gasket has a cross sectional profile of less than or equal to 0.75 inch wide and less than or equal to 1.0 inch thick.

10. The panel assembly as defined by claim 2, wherein said gasket is molded to said glass panel less than one quarter of an inch from said peripheral edge.

11. The panel assembly as defined by claim 5, wherein said polymeric gasket includes:
a molded body having a first portion in intimate contact with said primer layer; and
at least one flange extending from said body for spacing said panel from a mounting surface.

12. The panel assembly of claim 1 wherein said primer forming said layer has a transition temperature greater than 225° F., and said gasket is molded when said primer layer is at a temperature equal to or greater than 225° F.

13. The panel assembly of claim 1, further including an opaque ceramic coating bonded to said first surface of said panel and receiving said primer layer.

14. The panel assembly as defined by claim 1, wherein said polymeric gasket includes a molded body having a first portion in intimate contact with said primer layer and an opposite portion having a curved surface, said polymeric gasket extending from said panel assembly in a plane generally parallel to said first surface and for contact with the window opening.

15. The panel assembly as defined by claim 1, further including a guide at least partially encapsulated within said molded body and extending therefrom, said guide aligning said panel assembly with the window opening.

16. The panel assembly as defined by claim 1, further including a guide bonded to a second portion of said gasket opposite said first portion, and extending therefrom to align said panel assembly in the window opening.

17. The panel assembly as defined by claim 1, further including a mechanical fastener at least partially encapsulated within said polymeric gasket and projecting out of said polymeric gasket, said fastener adapted to mechanically assist in retaining said panel assembly in the window opening.

18. The panel assembly as defined by claim 1, further including an adhesive deposited on said panel for adhering said panel assembly in the window opening.

19. The panel assembly as defined by claim 18, wherein said adhesive includes a bead of adhesive extruded on said panel adjacent said polymeric gasket.

20. The panel assembly as defined by claim 18, wherein said adhesive includes an extruded bead on a surface of said polymeric gasket.

21. The panel assembly as defined by claim 1, further including a tape attached to a surface of said gasket opposite that bonded to said panel.

22. The panel assembly as defined by claim 1, further including:
a second polymeric gasket molded about and encapsulating at least a portion of said peripheral edge of said glass panel, said second gasket having at least a first securing flange extending from said peripheral edge inwardly toward a center of said glass panel and a lip portion which extends away from said peripheral edge.

23. The panel assembly as defined by claim 22, including a primer layer on said portion of said glass panel on which said second gasket is molded; said second gasket further including a second securing flange on a surface of said sheet-like panel opposite said first securing flange, for retaining said second gasket on said peripheral edge of said glass panel.

24. The panel assembly as defined by claim 2, wherein said panel assembly is soaked for more than 600 hours in water having a temperature of 175° F. (80° C.).

25. The panel assembly as defined by claim 2, wherein said panel assembly is soaked for more than 1,000 hours in water having a temperature of 175° F. (80° C.).

26. The panel assembly of claim 2, wherein said panel assembly is soaked for at least 1,000 hours in water having a temperature of 140° F. (40° C.).

27. A vehicle panel assembly for sealing a window opening, comprising:
a glass panel having a first and second generally opposing surfaces terminating in a peripheral edge;
a primer layer applied to a portion of one of said first and second surfaces, said primer forming said layer selected from a group of primers having a primer transition temperature greater than or equal to 200° F. where said primer layer achieves improved bonding of polymeric materials to a substrate;
at least one thermoplastic polymeric gasket molded to said glass panel on said primer layer applied to one of said first and second surfaces, said glass panel including said primer layer being preheated to a temperature equal to or greater than said transition temperature prior to the molding of said gasket, the adhesive strength of said gasket when formed with a length of approximately one inch, a width of approximately three-fourths inch, and a thickness of approximately one-half inch being sufficient to withstand a shear force of more than 300 pounds at a rate of 25 millimeters per minute, and for a gasket having a width of approximately three-fourths inch, a thickness of approximately one-half inch, and a length sufficient to allow a free end to be grasped and pulled back at 180° having a peel strength greater than 30 pounds per inch of width at a rate of 25 millimeters per minute after soaking for at least 250 hours in water having a temperature of at least 175° F. (80° C.).

28. The panel assembly as defined by claim 27, wherein said panel assembly is soaked for 600 hours in water having a temperature of 175° F. (80° C.).

29. The panel assembly as defined by claim 27, wherein said panel assembly is soaked for 1,000 hours in water having a temperature of 40° C.

30. The panel assembly as defined in claim 27, wherein said polymeric gasket is molded onto said primer layer on said panel while said primer layer is at a temperature greater than said primer transition temperature whereby adhesion of said gasket to said panel is improved.

31. The panel assembly as defined in claim 30, wherein said gasket is made from polyvinyl chloride.

32. The panel assembly as defined in claim 31, wherein said adhesive primer layer includes an acrylic base and an epoxy component and has a transition temperature greater than 225° F.

33. The panel assembly as defined in claim 32, wherein said primer forming said layer further includes a silane coupling agent.

34. The panel assembly as defined in claim 32, further including a silane coupling agent applied to said primer layer prior to molding of said gasket.

35. The panel assembly as defined in claim 33 wherein said primer forming said layer has a ratio of epoxy component to silane coupling agent, by equivalent weight, of greater than 1.0.

36. The panel assembly as defined in claim 27, wherein said polymeric gasket includes:

a body having a first portion in intimate contact with said primer layer; and at least one flange extending from said body for spacing said panel from a mounting surface.

37. The panel assembly as defined in claim 27, further including a guide at least partially encapsulated by said gasket and extending therefrom and aligning said panel assembly in the window opening.

38. The panel assembly as defined in claim 27, further including a mechanical fastener at least partially encapsulated within said gasket and projecting out of said gasket, said fastener adapted to mechanically assist in retaining said panel assembly in the window opening.

39. The panel assembly as defined in claim 27, further including a second polymeric gasket of predetermined profile molded on and encapsulating at least a portion of said peripheral edge of said panel, said second polymeric gasket having a first and second securing flanges extending from said peripheral edge onto said first and second opposing surfaces.

40. The panel assembly as defined in claim 27, further including an adhesive deposited on said panel for adhering said panel assembly in the window opening.

41. The panel assembly as defined in claim 40, wherein said adhesive includes an adhesive bead extruded on said first surface adjacent said polymeric gasket.

42. The panel assembly as defined in claim 40, wherein said adhesive includes an adhesive bead extruded on a surface of said gasket.

43. The panel assembly as defined in claim 27, further including a tape attached to a surface of said gasket opposite that bonded to said panel.

44. A panel assembly for use as a window in a vehicle opening, comprising:

a transparent glass panel having a first and second surfaces terminating in a peripheral edge;

an opaque ceramic frit coating bonded to a predetermined portion of said first surface of said panel;

a primer coating on at least a portion of said opaque ceramic frit coating, said primer forming said primer coating having a transition temperature of at least 200° F. at or above which said primer coating exhibits improved adhesion properties for a polymeric material to said ceramic frit coating;

a gasket of thermoplastic polymeric material molded on said first surface and said opaque ceramic frit coating and on said portion having said primer coating to produce a gasket on only one surface of said glass panel, said glass panel, ceramic frit coating and primer layer being preheated to a temperature equal to or greater than said transition temperature; said gasket molded on said primer coating after said glass panel, ceramic frit coating and primer coating have been heated to said transition temperature to bond said gasket with said panel, whereby a gasket having a length of about one inch, a width of about three-fourths inch, and a thickness of about one-half inch is bonded to said window panel with sufficient strength to withstand a shear force test of greater than 300 pounds at a rate of 25 millimeters per minute, and has a peel strength of greater than 30 pounds per inch of width at a rate of 25 millimeters per minute after soaking for more than 250 hours in water at least 175° F. (80° C.).

45. The panel assembly as defined in claim 44, wherein said panel assembly has been soaked for more than 600 hours.

46. The panel assembly as defined in claim 44, wherein said panel assembly has been soaked for more than 1,000 hours.

47. The panel assembly as defined in claim 44, wherein said gasket has cross sectional dimensions less than one inch wide and one inch thick.

48. The panel assembly as defined in claim 44 wherein said gasket includes a body having a first side bonded to said panel and a second side defining at least one flange for engaging the vehicle opening.

49. The panel assembly as defined in claim 48 further including at least one locating device at least partially encapsulated within said gasket for aligning the panel assembly in the vehicle opening.

50. The panel assembly as defined in claim 48 further including at least one mechanical fastener at least partially encapsulated by said gasket for mechanically assisting in retaining the panel assembly in the vehicle opening.

51. The panel assembly as defined in claim 48 further including a locating device adhered to said second side of said body for locating the panel assembly in the vehicle opening.

52. The panel assembly as defined in claim 51 wherein said locating device further includes a mechanical fastener for mechanically assisting in retaining the panel assembly in the vehicle opening.

53. The panel assembly as defined in claim 48 further including an adhesive on said second side of said body for bonding the panel assembly in the vehicle opening.

54. The panel assembly as defined in claim 44 further including an adhesive on said first surface of said panel for adhering the panel assembly in the vehicle opening.

55. The panel assembly as defined in claim 44 wherein said primer forming said coating includes an acrylic base and an epoxy component.

56. The panel assembly as defined in claim 55 wherein said primer forming said coating further includes a silane coupling agent added thereto.

57. The panel assembly as defined in claim 55 further including a silane coupling agent applied to said primer coating.

58. The panel assembly as defined in claim 56 wherein said primer forming said coating includes a ratio, by equivalent weight, of said epoxy component to said silane coupling agent of greater than one.

59. The panel assembly as defined in claim 55 wherein said primer is selected from the group consisting essentially of: B. F. Goodrich A-1100B and A-1167B, B. F. Goodrich Exp 541 and Exp 535, Donnelly A-47, and Donnelly A-57.

60. A window panel assembly for a vehicle, comprising:

a glass panel having at least one surface;

a ceramic coating adhered to said one surface;

a primer coating applied to said ceramic coating; said primer coating having a transition temperature greater than or equal to 200° F., at or above which improved adhesion qualities are exhibited for polymeric gaskets molded thereon at or above said transition temperature; said primer coating being heated on said glass panel and ceramic coating to a temperature at least equal to said transition temperature; and a polymeric gasket molded on said primer coating on a single surface of said glass panel when said primer coating is at a temperature at least equal to said primer transition temperature.

61. The panel assembly as defined in claim 60, wherein said ceramic coating is cleaned prior to the application of said primer coating.

62. The panel assembly as defined in claim 60, wherein the molding of said gasket onto said portion of said ceramic coating at said temperature and the heating of said primer coating to at least said primer transition temperature results in a bond between said panel and said gasket having an adhesion strength for such a gasket formed with a length of about one inch, a width of about three-fourths inch, and a thickness of about one-half inch sufficient to withstand a shear force on the order of 300 pounds at a rate of 25 millimeters per minute, and a peel strength for such a gasket having a width of about three-fourths inch, a thickness of about one-half inch, and a length sufficient to allow a free end to be grasped and pulled back 180° greater than 30 pounds per inch of width at a rate of 25 millimeters per minute, after being immersed in at least 175° F. (80° C.) water for more than 250 hours.

63. The panel assembly as defined in claim 62, wherein said bond withstands said shear and peel tests after being immersed in 80° C. water for more than 600 hours.

64. The panel assembly as defined in claim 62, wherein said bond withstands said shear and peel tests after being immersed in 80° C. water for more than 1,000 hours.

65. The panel assembly as defined in claim 62 wherein the molding of said gasket on said panel is made in a mold apparatus having a mold cavity including a mold cavity fill pressure within the range of 15–25 psig, a mold cavity pack pressure within the range of 70–80 psig, and a mold cavity hold pressure within the range of 55–65 psig.

66. The panel assembly as defined in claim 62, wherein said gasket is molded in a mold apparatus at a fill time of less than 0.5 second, a packing rate of less than 3 seconds, a holding rate of less than 10 seconds, and a cure rate of less than 30 seconds.

67. The panel assembly as defined in claim 62, wherein said gasket is molded using polyvinyl chloride having an injection temperature measured at an injection nozzle of between 350° and 410° F.

68. A panel assembly for closing a vehicle window opening having a gasket on one surface thereof, comprising:

a glass panel having first and second surfaces terminating in a peripheral edge;

a primer layer applied to a portion of said first surface, said primer layer heated to a predetermined transition temperature equal to at least 200° F. where improved adhesion properties are achieved for polymeric gaskets formed thereon; and a polymeric gasket formed on said portion of said first surface of said glass panel having said primer layer, said gasket formed on said primer layer when said primer layer is at a temperature equal to or greater than said transition temperature and bonded to said portion of said glass panel.

69. The panel assembly as defined by claim 68, wherein said polymeric gasket is a thermoplastic material.

70. The panel assembly as defined by claim 69, wherein said thermoplastic material is a thermoplastic elastomer selected from the group including a thermoplastic rubber, a thermoplastic urethane, a thermoplastic olefin, and a thermoplastic vinyl.

71. The panel assembly as defined by claim 70, wherein said thermoplastic vinyl is polyvinyl chloride.

72. A panel assembly for closing a vehicle window opening having a gasket on one surface thereof, comprising:

a transparent glass panel having first and second surfaces terminating in a peripheral edge;

a primer layer applied to said first surface, said primer forming said layer having a predetermined transition temperature of at least 200° F. at or above which improved adhesion properties are achieved for polymeric gaskets formed thereon; and at least one polymeric gasket injection molded on said first surface of said glass panel having said primer layer, said gasket injection molded on and bonded to said primer layer when said primer layer has been heated to a temperature equal to or greater than said transition temperature of said primer.

73. The panel assembly as defined by claim 72, wherein said polymeric gasket is a thermoplastic material.

74. The panel assembly as defined by claim 73, wherein said thermoplastic material is a thermoplastic elastomer selected from the group including a thermoplastic rubber, a thermoplastic urethane, a thermoplastic olefin, and a thermoplastic vinyl.

75. The panel assembly as defined by claim 74, wherein said thermoplastic vinyl is polyvinyl chloride.

* * * * *

UNITED STATES PATENT AND TRADEMARK OFFICE
CERTIFICATE OF CORRECTION

Page 1 of 2

PATENT NO. : 5,544,458
DATED : August 13, 1996
INVENTOR(S) : Daniel J. Fisher et al.

It is certified that error appears in the above-identified patent and that said Letters Patent is hereby corrected as shown below:

Column 6, line 55:
"A-4793" should be --A47 (includes silane coupling agent)--

Column 8, line 54:
Delete "(Donnelly P-527) and insert therefor --5,475,956--

Column 8, line 62:
"spring dip" should be --spring clip--

Column 9, line 36:
"each comer" should be --each corner--

Column 9, lines 54 and 55:
"spree" should be --sprue-- (both occurences)

Column 10, line 5:
"comer" should be --corner--

Column 8, line 53:
"874,635" should be -- 951,733--

Column 11, line 59:
"comers" should be --comers--

Column 14, line 44:
After "pounds" insert --per square inch--

UNITED STATES PATENT AND TRADEMARK OFFICE
CERTIFICATE OF CORRECTION

PATENT NO. : 5,544,458
DATED : August 13, 1996
INVENTOR(S) Daniel J. Fisher et al.

It is certified that error appears in the above-identified patent and that said Letters Patent is hereby corrected as shown below:

Column 14, line 45:
"per liner" should be --per lineal--

Column 16, line 21:
"frown" should be --from--

Column 17, line 58:
"532 + 13.9" should be --532 $\pm$ 13.9--

Column 17, line 60:
After Table II, add footnote --[1]Only one sample tested.--

Column 20, line 5:
Delete "sheet-like" and insert therefor --glass--

Signed and Sealed this

Twenty-seventh Day of July, 1999

Attest:

Q. TODD DICKINSON

*Attesting Officer*     *Acting Commissioner of Patents and Trademarks*